(12) United States Patent
Rinfret et al.

(10) Patent No.: US 7,819,148 B2
(45) Date of Patent: Oct. 26, 2010

(54) SYSTEM AND METHOD OF MONITORING THE QUALITY OF CUTTING

(75) Inventors: Jean-Roch Rinfret, St-Nicolas (CA); Jean-Luc Lessard, Sherbrooke (CA); Pierre Poulin, Québec (CA); Maxime Diamond, Québec (CA)

(73) Assignee: Centre de Recherche Industrielle du Quebec, Quebec, QC (CA)

( * ) Notice: Subject to any disclaimer, the term of this patent is extended or adjusted under 35 U.S.C. 154(b) by 1209 days.

(21) Appl. No.: 11/418,044

(22) Filed: May 5, 2006

(65) Prior Publication Data

US 2006/0289086 A1    Dec. 28, 2006

(30) Foreign Application Priority Data

May 5, 2005    (CA)    .................................... 2506493

(51) Int. Cl.
*B23Q 15/00*    (2006.01)
(52) U.S. Cl. ........................ 144/356; 144/359; 144/382; 144/394; 144/404
(58) Field of Classification Search ................. 144/356, 144/357, 359, 378, 392, 394, 402, 404, 39; 83/75.5
See application file for complete search history.

(56) References Cited

U.S. PATENT DOCUMENTS

| | | |
|---|---|---|
| 4,308,461 A | 12/1981 | Tuomaala |
| 4,311,915 A | 1/1982 | Stratton |
| 4,424,530 A | 1/1984 | Taylor |
| 4,555,633 A | 11/1985 | Björkelund |
| 4,770,537 A | 9/1988 | Koskenohi |
| 4,867,213 A | 9/1989 | Bolton et al. |
| 4,879,659 A | 11/1989 | Bowlin et al. |
| 4,939,379 A | 7/1990 | Horn |
| 4,941,100 A | 7/1990 | McFarlane et al. |
| 4,947,909 A | 8/1990 | Stroud |

(Continued)

FOREIGN PATENT DOCUMENTS

WO    WO 86/01590 A1    3/1986

*Primary Examiner*—Shelley Self
(74) *Attorney, Agent, or Firm*—Jean-Claude Boudreau

(57) ABSTRACT

A method and system for monitoring the quality of log cutting either off-line or in real-time is based on optical measurement of half-squared or full-squared cants characteristics as produced at primary or secondary cutting stage, so as to increase the proportion of high-value wood pieces that can be recovered from full squared-cants produced at the sawing stage. The log is fed lengthwise to a primary cutting station (canter) capable of producing the first pair of opposing cut faces, while guiding the log substantially in a direction of the machine axis. The profile of the peripheral log surface at a plurality of cross-sections along the machine axis is measured to generate corresponding post-cut profile data, from which an estimation of log raw profile characteristics is made, to generate corresponding raw profile data. Then, from post-cut and raw profile data, resulting data on at least one parameter related to the cutting quality of the log. The proposed monitoring system and method provide accurate control of target dimensions, while optimizing the adjustment of other quality related parameters such as faces parallelism and cant centering, as well as to measure the level of some surface defects generated at cutting such as knife marks, stripping and roughness, in order to obtain a more complete performance diagnostic.

13 Claims, 48 Drawing Sheets

U.S. PATENT DOCUMENTS

| | | |
|---|---|---|
| 5,111,862 A | 5/1992 | Dietz |
| 5,262,956 A | 11/1993 | DeLeeuw |
| 5,421,385 A | 6/1995 | McGee |
| 5,429,161 A | 7/1995 | Allard |
| 5,615,003 A | 3/1997 | Hermary et al. |
| 5,627,635 A | 5/1997 | Dewan |
| 5,644,392 A | 7/1997 | Soest et al. |
| 5,680,219 A | 10/1997 | Rydningen |
| 5,765,617 A * | 6/1998 | Mierau et al. ............ 144/387 |
| 5,884,682 A | 3/1999 | Kennedy et al. |
| 5,905,567 A | 5/1999 | Dewan |
| 5,949,086 A | 9/1999 | Reponen et al. |
| 5,986,745 A | 11/1999 | Hermary et al. |
| 6,039,098 A * | 3/2000 | Kennedy et al. ............ 144/357 |
| 6,100,986 A | 8/2000 | Rydningen |
| 6,122,065 A | 9/2000 | Gauthier |
| 6,148,884 A * | 11/2000 | Bolyard et al. ............. 144/369 |
| 6,219,585 B1 | 4/2001 | Hughes et al. |
| 6,463,402 B1 | 10/2002 | Bennett et al. |
| 6,466,305 B1 | 10/2002 | McBain |
| 6,705,363 B2 | 3/2004 | McGehee et al. |

\* cited by examiner

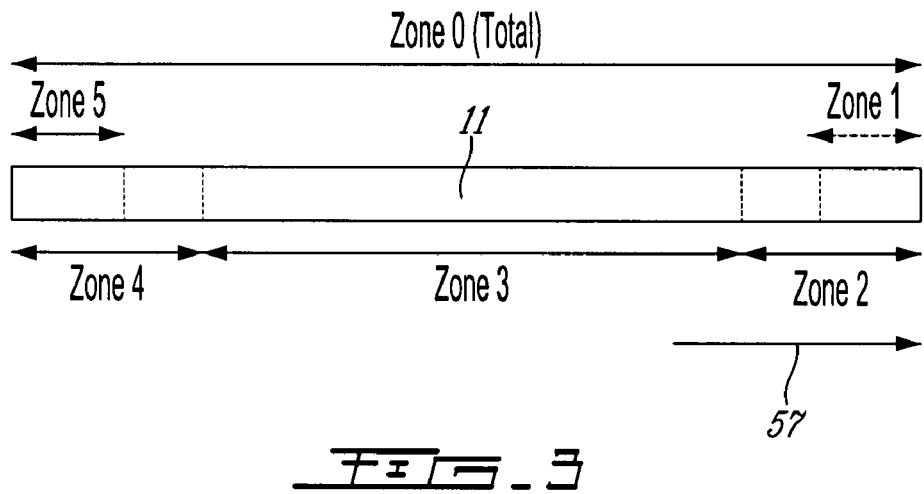
FIG_3
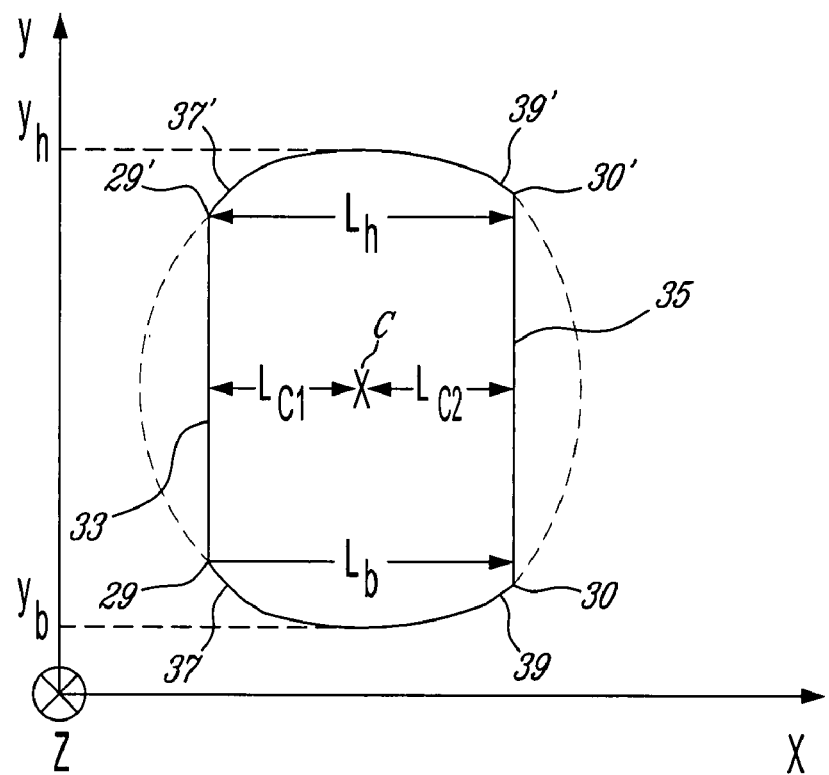
FIG_4A

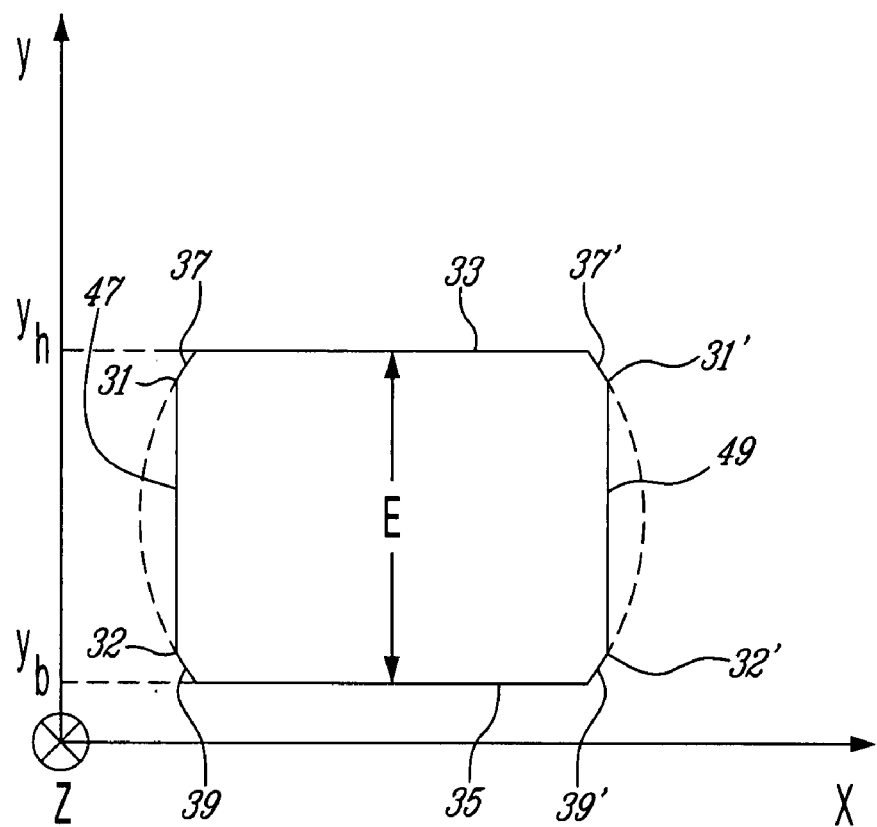
FIG_4B

FIG_11

Results

Pieces

| No | Status | Nb. Planes | Nominal | Ave. width | Ave. height | Read length | Centered | Start time | Time (sec) |
|---|---|---|---|---|---|---|---|---|---|
| 0 | OK | 704 | 4 | 4.252 | 3.756 | 170.935 | -- | 10:34:58:961 | 0.002 |
| 1 | OK | 727 | 4 | 4.260 | 3.804 | 176.545 | -- | 10:35:00:961 | 0.001 |
| 2 | OK | 754 | 6 | 5.976 | 3.608 | 183.090 | -- | 10:35:02:961 | 0.002 |
| 3 | OK | 704 | 4 | 4.261 | 3.429 | 170.935 | -- | 10:35:04:961 | 0.002 |
| 4 | ERROR | 758 | 4 | 4.256 | 3.549 | 184.025 | -- | 10:35:06:962 | 0.002 |
| 5 | OK | 765 | 3 | 3.016 | 3.477 | 185.895 | -- | 10:35:08:962 | 0.002 |
| 6 | OK | 750 | 3 | 3.005 | 3.629 | 182.155 | -- | 10:35:10:963 | 0.001 |
| 7 | OK | 727 | 6 | 5.935 | 3.686 | 176.545 | -- | 10:35:12:963 | 0.002 |
| 8 | OK | 723 | 4 | 4.227 | 3.391 | 175.610 | -- | 10:35:14:963 | 0.002 |

Events

| Date - Time | | Description |
|---|---|---|
| 17/02/2005 | 10:33:33:514 | Mode change --> Mode: none |
| 17/02/2005 | 10:33:33:524 | Connection to profilometry server |
| 17/02/2005 | 10:33:33:694 | Parameters modification |
| 17/02/2005 | 10:34:50:625 | Parameters modification |
| 17/02/2005 | 10:34:59:117 | Mode change --> Mode: simulation |
| 17/02/2005 | 10:35:16:101 | Mode change --> Mode: none |
| 17/02/2005 | 10:35:50:070 | Mode change --> Mode: piece |

FIG. 13

Piece profile

Heading

- Number: 139
- Status: OK (7ff)
- ID canter: 1
- Centered pattern: ---
- Nb. planes: 602

Knife marks
- Left: 17
- Right: 15

Length
- System: 200.318
- PLC: 0

Rotation
- Error: 60.603
- Sweep: 3.253
- Correlation: 0.052

Time stamp
- Date: 12/10/2004
- Start time: 10:20:04:500
- End time: 10:20:06:843

Values — ● Per plane ○ Per face

| Plane | Position (po) | Status | Top width | Center width | Bottom width | Height | Infeed area | Outfeed area |
|---|---|---|---|---|---|---|---|---|
| 1 | 0.000 | ff | 5.787 | 5.743 | 5.700 | 8.563 | 45.051 | 28.107 |
| 2 | 0.284 | ff | 5.805 | 5.797 | 5.787 | 8.563 | 47.202 | 31.654 |
| 3 | 0.581 | ff | 5.834 | 5.821 | 5.804 | 8.563 | 46.938 | 31.064 |
| 4 | 0.859 | ff | 5.816 | 5.814 | 5.813 | 8.563 | 47.119 | 31.506 |
| 5 | 1.156 | ff | 5.789 | 5.807 | 5.829 | 8.563 | 47.258 | 31.821 |
| 6 | 1.486 | ff | 5.769 | 5.803 | 5.846 | 8.563 | 47.666 | 32.695 |
| 7 | 1.802 | ff | 5.757 | 5.793 | 5.841 | 8.563 | 48.179 | 33.661 |
| 8 | 2.067 | ff | 5.753 | 5.789 | 5.836 | 8.563 | 47.905 | 33.285 |
| 9 | 2.364 | ff | 5.765 | 5.799 | 5.843 | 8.563 | 48.668 | 34.371 |
| 10 | 2.629 | ff | 5.750 | 5.800 | 5.861 | 8.563 | 48.740 | 34.555 |
| 11 | 2.946 | ff | 5.772 | 5.806 | 5.845 | 8.563 | 48.767 | 34.544 |
| 12 | 3.236 | ff | 5.779 | 5.811 | 5.854 | 8.563 | 51.370 | 37.255 |
| 13 | 3.553 | ff | 5.777 | 5.813 | 5.862 | 8.563 | 53.181 | 39.415 |
| 14 | 3.831 | ff | 5.762 | 5.808 | 5.864 | 8.563 | 52.470 | 38.583 |
| 15 | 4.128 | ff | 5.743 | 5.798 | 5.858 | 8.563 | 51.494 | 37.698 |

*Fig. 14*

Values ──── ⊙ Per plane ⊙ Per face  59'

| Plane | Position (po) | Face | Status | Roughness | Top wa. | Area | Bottom wa. |
|---|---|---|---|---|---|---|---|
| 1 | 0.000 | Left | ff | 0.021 | 1.460 | 5.042 | 2.061 |
|   |       | Right | ff | 0.016 | 2.378 | 3.776 | 2.411 |
| 2 | 0.284 | Left | ff | 0.018 | 1.220 | 5.613 | 1.730 |
|   |       | Right | ff | 0.024 | 2.559 | 4.027 | 1.978 |
| 3 | 0.581 | Left | ff | 0.019 | 1.221 | 5.396 | 1.947 |
|   |       | Right | ff | 0.015 | 2.523 | 4.100 | 1.941 |
| 4 | 0.859 | Left | ff | 0.013 | 1.220 | 5.416 | 1.927 |
|   |       | Right | ff | 0.012 | 2.468 | 4.189 | 1.906 |
| 5 | 1.156 | Left | ff | 0.011 | 1.239 | 5.470 | 1.855 |
|   |       | Right | ff | 0.013 | 2.432 | 4.204 | 1.927 |

FIG. 15

Analysed results

Piece no: 5  
Status: 1  
Centered pattern: Yes  
Nb. of planes: 765  
Nominal width: 3  
Read lenght: 185.895

~60

| Sawing variation | Shape analysis | Positioning | Surface/cutting | Volumes |

| Measurement | Total | Zone 1 | Zone 2 | Zone 3 | Zone 4 | Zone 5 |
|---|---|---|---|---|---|---|
| Nb. values used | 820 | 28 | 160 | 508 | 152 | 28 |
| Nb. values cancelled | 710 | 20 | 136 | 434 | 140 | 16 |
| Ave. deviation dimension | 0.205 | 0.203 | 0.211 | 0.206 | 0.197 | 0.167 |
| Ave. width | 3.015 | 3.013 | 3.021 | 3.016 | 3.007 | 2.977 |
| Widths variance | 0.085 | 0.068 | 0.084 | 0.082 | 0.097 | 0.108 |
| Widths standard deviation | 0.291 | 0.260 | 0.289 | 0.286 | 0.312 | 0.328 |
| Sum (square dim. deviations) | 103.866 | 2.988 | 20.432 | 62.857 | 20.576 | 3.693 |

Fig. 16

| Sawing variation | Shape analysis | Positioning | Surface/cutting | Volumes | | | | |
|---|---|---|---|---|---|---|---|---|
| Measurement | | Total | Zone 1 | Zone 2 | Zone 3 | Zone 4 | Zone 5 |
| Nb. values used | | 227 | 5 | 43 | 143 | 41 | 8 |
| Nb. values cancelled | | 538 | 19 | 105 | 328 | 105 | 14 |
| Ave. X off-axis | | -0.483 | 2.276 | -0.344 | -0.463 | -0.700 | -2.595 |
| Ave. Y off-axis | | 0.184 | -1.316 | -0.603 | 0.371 | 0.357 | 1.350 |
| Log angle XZ | | -0.034 | 0.386 | -0.535 | -0.006 | -1.176 | -15.205 |
| Top end offset | | -0.223 | 2.165 | 0.555 | -0.421 | 15.911 | 229.479 |
| Rotation error | | -2.876 | 15.532 | 2.115 | -0.298 | -14.985 | -27.958 |
| Rotation correlation | | -0.053 | 0.391 | 0.034 | -0.005 | -0.327 | -0.716 |
| Rotation sweep | | 10.030 | 10.030 | 10.030 | 10.030 | 10.030 | 10.030 |

FIG. 18

| Sawing variation | Shape analysis | Positioning | Surface/cutting | Volumes | | | |
|---|---|---|---|---|---|---|---|
| Measurement | Total | Zone 1 | Zone 2 | Zone 3 | Zone 4 | Zone 5 | |
| Nb. values used | 271 | 15 | 54 | 173 | 44 | 11 | |
| Nb. values cancelled | 494 | 9 | 94 | 298 | 102 | 11 | |
| Aver. roughness L | 0.124 | 0.141 | 0.125 | 0.122 | 0.131 | 0.130 | |
| Aver. roughness R | 0.122 | 0.120 | 0.121 | 0.122 | 0.125 | 0.171 | |
| Tea. total area L | 100.126 | 4.439 | 24.134 | 64.856 | 38.923 | 46.191 | |
| Tea. total area R | 99.398 | 1.096 | 13.998 | 81.224 | 89.817 | 15.347 | |
| Tea. ave. dept. R | 452.305 | 24.278 | 88.604 | 306.292 | 62.884 | 17.470 | |
| Tea. ave. dept. R | 407.476 | 19.356 | 71.355 | 268.672 | 66.392 | 22.546 | |
| Aver. nb. tea. occ. L | 8.063 | 11.000 | 10.574 | 7.422 | 7.500 | 5.545 | |
| Aver. nb. tea. occ. R | 7.934 | 2.933 | 6.926 | 7.896 | 9.318 | 10.818 | |
| Cut area L | 316.745 | 8.223 | 49.427 | 202.022 | 516.349 | 53.733 | |
| Cut area R | 336.059 | 13.281 | 66.826 | 269.500 | 625.220 | 615.602 | |
| Prob. knives L | 0.551 | -- | -- | -- | -- | -- | |
| Prob. knives R | 0.610 | -- | -- | -- | -- | -- | |

FIG. 19

| Sawing variation | Shape analysis | Positioning | Surface/cutting | Volumes | | | | |
|---|---|---|---|---|---|---|---|---|
| Measurement | Total | Zone 1 | Zone 2 | Zone 3 | Zone 4 | Zone 5 | | |
| Nb. values used | 227 | 5 | 43 | 143 | 41 | 8 | | |
| Nb. values cancelled | 538 | 19 | 105 | 328 | 105 | 14 | | |
| Ave. height | 3.557 | 4.646 | 3.890 | 30477 | 3.486 | 2.811 | | |
| Infeed volume | 2552.045 | 92.542 | 567.779 | 1940.714 | 2154.158 | 743.603 | | |
| Outfeed volume | 1864.956 | 67.627 | 414.915 | 1418.214 | 1574.193 | 543.402 | | |

FIG. 20

Processing parameters

General

Piece detecting camera : Right ▽

Min. Nb. points to detect piece start : 50

Min. Nb. points to detect piece end : 40

Nb. planes before overlenght piece event : 10000

Data to send
- ☑ Laser points
- ☑ Centroid pixel
- ☑ Centroid TSAI

☐ Start statistics calculation (system status)
☐ Process interuption for lost planes (overwriting)

Acceptable Nb. of lost planes (without process interruption) 0

| LEFT | RIGHT |

Image source : File ▽

File name : [_____] ...

☐ Use distorsion correction
☐ Horizontal flip
☐ Vertical flip

Laser intensity threshold 128
Length of laser exposure 0.003

Left limit column 0
Right limit column 1023
Top limit line 0
Bottom limit line 201

[ Calibration parameters and constants ]

[ OK ] [ Cancel ]

FIG_26

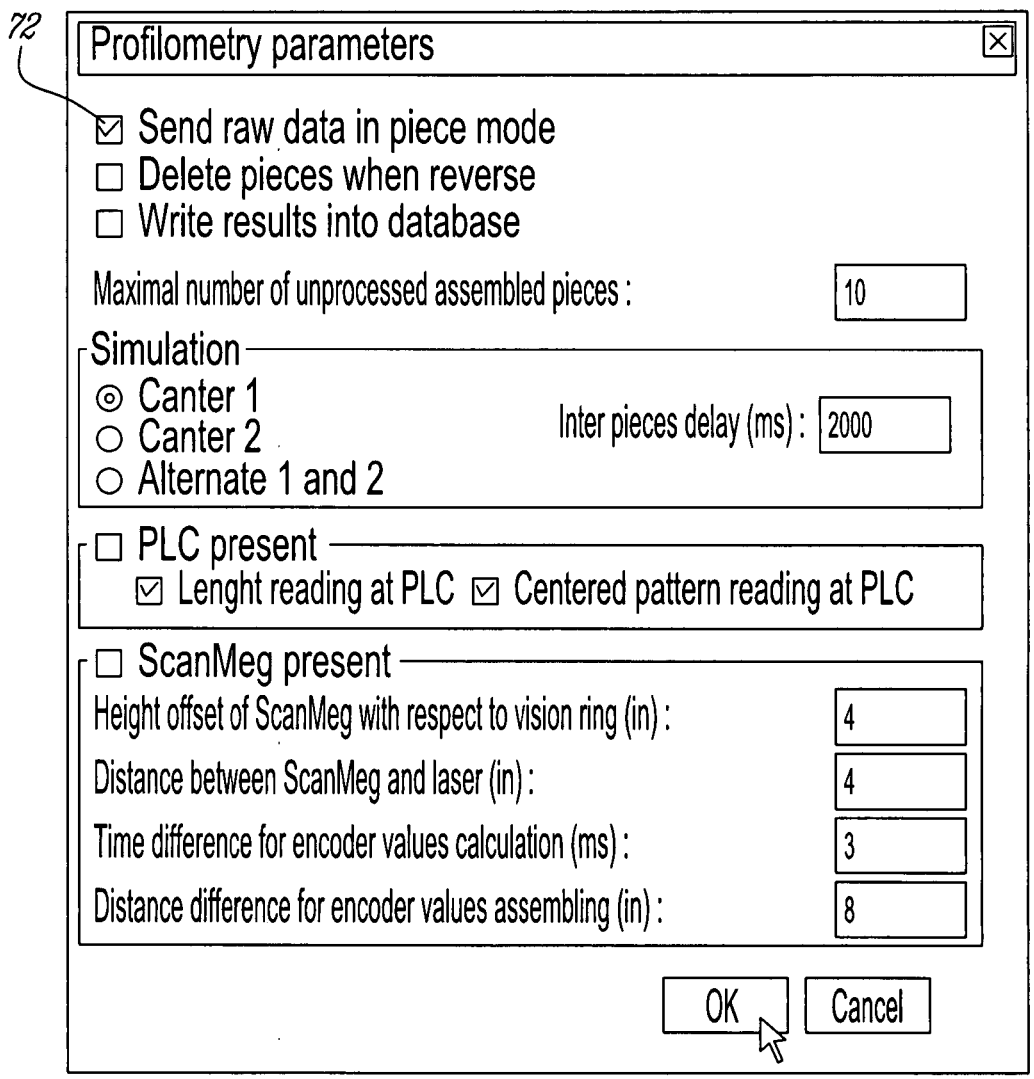
FIG_27

FIG. 28

Analyzer parameters

Dimensions (in)

| Nominal | Target | Min | Max (ex... | Req. flat dim. |
|---|---|---|---|---|
| 3 | 2.810 | 2.200 | 3.200 | 0.000 |
| 4 | 3.755 | 3.200 | 4.500 | 0.000 |
| 6 | 5.830 | 5.200 | 6.500 | 0.000 |
| 8 | 7.775 | 6.500 | 9.000 | 0.000 |

Add  Modify  Delete

Zones

Z1  Z2  Z3  Z4  Z5

Length zone 1 (in) : 6
Length zone 2 (in) : 18
Length zone 3 (in) : Remaining
Length zone 4 (in) : 18
Length zone 5 (in) : 6

OK  Cancel

FIG. 30

| □ MPProfilo |
|---|
| File  Edit  Connect  Parameters  Process  Diagnostics  Display  ? |
| □ □ ⊞ ⊟ ✂ ⌂ 🗐 △ □ 🗔 | ✓ Tool bar |
|  | ✓ Status bar |
|  | Display pause |
|  | Camera(s) image |
|  | Planes data |
|  | Raw pieces |
|  | Piece profilo |
|  | Analysed results    84 |
|  | Graphics |
|  | G4 status |
|  | Profilometry status |
|  | Acquisition system status |
|  | Results |
|  | 1 Results |
|  | 2 Raw pieces |
|  | 3 Piece profilo |
|  | ✓ 4 Analysed results |

─Results─
─Pieces─

| No | Status | Nb. Planes | Nominal | Ave. width | Ave. heig | Time | Time |
|---|---|---|---|---|---|---|---|
| 0 | OK | 704 | 4 | 4.252 | 3.756 | :375 | 0.002 |
| 1 | OK | 727 | 4 | 4.260 | 3.804 | :375 | 0.002 |

─Raw piece─

| No | Status | Length | Nb. Planes | First |
|---|---|---|---|---|
| 1 | OK | 184:182 | 705 | 23179 |
| 0 | OK | 197:072 | 725 | 22246 |

□ Piece profilo

─Heading─
Number:           □ Analysed result   Piece no:  0
Status:
ID canter:
Centered pattern:                     Status:                1

─Events─
Date -

Cant Analysis - [Main Menu: Form]

| Main Menu |
| Graphics |
| Results |
| Alarms |
| Parameters |
| Variables |
| Pieces |
| Connect |

Last pieces canter 1

| No | Date/Time | Length | Nominal | Centered |
|---|---|---|---|---|
| 1191 | 2005-03-31 10:00:26 | 190.246 | 4 | -1 |
| 1190 | 2005-03-31 10:00:23 | 196.317 | 4 | -1 |
| 1189 | 2005-03-31 10:00:19 | 194.774 | 4 | -1 |
| 1188 | 2005-03-31 10:00:16 | 194.793 | 4 | -1 |
| 1187 | 2005-03-31 10:00:11 | 191.338 | 4 | -1 |
| 1186 | 2005-03-31 10:00:07 | 192.913 | 4 | -1 |
| 1185 | 2005-03-31 10:00:04 | 192.746 | 4 | -1 |

Last pieces canter 2

| No | Date/Time | Length | Nominal | Centered |
|---|---|---|---|---|
| 1241 | 2005-03-31 10:00:15 | 200.800 | 4 | -1 |
| 1240 | 2005-03-31 10:00:12 | 203.820 | 4 | -1 |
| 1239 | 2005-03-31 10:00:07 | 197.740 | 6 | -1 |
| 1238 | 2005-03-31 10:00:03 | 199.410 | 4 | -1 |
| 1237 | 2005-03-31 10:00:00 | 199.520 | 4 | -1 |
| 1236 | 2005-03-31 09:59:57 | 201.410 | 4 | -1 |
| 1235 | 2005-03-31 09:59:54 | 197.010 | 4 | -1 |

Non-resolved events

| Type | Date/Time | Canter | Dimension | Description |
|---|---|---|---|---|
| | | | | |

Suggestions: No suggestion

FIG. 34

| | | | Sawing Variation | Shape Analysis | Positioning | Surface/Cutting | Volumes | |
|---|---|---|---|---|---|---|---|---|

Equipment: Canter 1
Dimension: 4 in

Last analysed results

| Variable | Count | Time | Zone 1 | Zone 2 | Zone 3 | Zone 4 | Zone 5 | Total |
|---|---|---|---|---|---|---|---|---|
| Average: Weighted rotation error | 41 | 09:59:22 | 0.070 | -7.752 | -6.381 | -8.875 | -14.285 | -1.575 |
| Standard deviation: Weighted rotation error | 41 | 09:59:22 | 31.041 | 14.958 | 13.780 | 24.647 | 38.169 | 11.934 |
| Average: Log angle according to X Z axis (in /ft) | 41 | 09:59:22 | 0.021 | -0.045 | -0.020 | -0.038 | -0.421 | -0.015 |
| Standard deviation: Log angle according to X Z axis (in /ft) | 41 | 09:59:22 | 0.764 | 0.161 | 0.039 | 0.203 | 4.287 | 0.014 |
| Average: Distance from log pivot to cutting front (in) | 41 | 09:59:22 | 3.088 | 23.537 | 82.145 | 175.667 | 192.222 | 73.465 |
| Standard deviation: Distance from log pivot to cutting front (in) | 41 | 09:59:22 | -0.681 | -0.913 | -0.959 | -0.998 | -1.000 | -0.826 |
| Average: Distance between log pivot and machine axis (in) | 41 | 09:59:22 | 0.096 | 0.101 | -0.053 | -0.086 | -0.341 | -0.010 |
| Standard deviation: Distance between log pivot and machine axis (in) | 41 | 09:59:22 | 0.211 | 0.141 | 0.079 | 0.174 | 0.788 | 0.059 |
| Front support connection for off-axis (in) | 41 | 09:59:22 | 0.204 | -0.050 | -0.022 | 0.266 | 4.156 | 0.002 |
| Rear support connection for off-axis (in) | 41 | 09:59:22 | 0.376 | -0.421 | -0.193 | -0.049 | 0.649 | -0.124 |
| Top - end position at cutting front | 41 | 09:59:22 | 0.093 | 0.188 | 0.087 | 0.467 | 6.400 | 0.082 |

Add Alarm

Description:
Mean width > maximal dimension 3 inches

Rule 1
Analysis variable
Mean: Read Width (in)

Operator
> | 2.84 | ⊗ | 2.86

☐ Total
☐ Zone 1
☐ Zone 2
☑ Zone 3
☐ Zone 4
☐ Zone 5

Dimensions
☐ All
☑ 3 in
☐ 4 in
☐ 6 in
☐ 8 in

☑ Active

Operator create rules  none ▷

Rule 2
Analysis variable

Operator
> | 0 | | 0

☐ Total
☐ Zone 1
☐ Zone 2
☐ Zone 3
☐ Zone 4
☐ Zone 5

Suggestions:

PLC code
7

OK    Cancel

Historic of events:

| Type | Date/Time | Dim |
|---|---|---|
| ⚠ Warning | 2005-03-31 09:11:42 | |
| ⓘ Information | 2005-03-31 09:19:30 | |
| ⚠ Warning | 2005-03-31 09:55:12 | |

Variables
Pieces
Connect

Cant Analysis [Main Menu: Form]

Equipment: Canter 1

Dimensions

| Nominal | Dimension name | Low critical | Target | High critical |
|---------|----------------|--------------|--------|---------------|
| 3 | 3 in | 2.76 | 2.81 | 2.86 |
| 4 | 4 in | 3.705 | 3.755 | 3.805 |
| 6 | 6 in | 5.78 | 5.83 | 5.88 |
| 8 | 8 in | 7.725 | 7.775 | 7.825 |
| | | | | |

Main Menu | Graphics | Results | Alarms

FIG. 38A

Variable sent to PLC

| Active | Analysis Variable | Dimension | Zone | OPC item name | Integer | Multiply by |
|---|---|---|---|---|---|---|
| ▽ | ▷ | ▷ | ▷ | ▷ | | |
| □ | Average: read width (in) ▷ | 3 in ▷ | Zone 3 ▷ | CRIQ.CLX_GL.CRIQ_C1_width_3in ▷ | ☑ | 1000 |
| □ | Average: read width (in) ▷ | 4 in ▷ | Zone 3 ▷ | CRIQ.CLX_GL.CRIQ_C1_width_4in ▷ | ☑ | 1000 |
| □ | Average: read width (in) ▷ | 6 in ▷ | Zone 3 ▷ | CRIQ.CLX_GL.CRIQ_C1_width_6in ▷ | ☑ | 1000 |
| □ | Average: read width (in) ▷ | 8 in ▷ | Zone 3 ▷ | CRIQ.CLX_GL.CRIQ_C1_width_8in ▷ | ☑ | 1000 |
| □ | Target: calculated width (in) ▷ | 3 in ▷ | Zone 3 ▷ | CRIQ.CLX_GL.CRIQ_C1_target_3in ▷ | ☑ | 1000 |
| □ | Target: calculated width (in) ▷ | 4 in ▷ | Zone 3 ▷ | CRIQ.CLX_GL.CRIQ_C1_target_4in ▷ | ☑ | 1000 |
| □ | Target: calculated width (in) ▷ | 6 in ▷ | Zone 3 ▷ | CRIQ.CLX_GL.CRIQ_C1_target_6in ▷ | ☑ | 1000 |

Alarms sent to PLC

| Active | Event Type | OPC item name | Min. PLC code | Number of Alarms |
|---|---|---|---|---|
| ▽ | ▷ | ▷ | | ▷ |
| □ | warning ▷ | CRIQ.CLX_GL.CRIQ_C1_warning 0 ▷ | 0 | 32 |
| □ | warning ▷ | CRIQ.CLX_GL.CRIQ_C1_warning 1 ▷ | 32 | 32 |
| □ | Error ▷ | CRIQ.CLX_GL.CRIQ_C1_Error 0 ▷ | 0 | 32 |
| □ | Error ▷ | CRIQ.CLX_GL.CRIQ_C1_Error 1 ▷ | 32 | 32 |
| ✽ | | | | |

- Parameters
- Variables
- Pieces
- Connect

FIG. 39B

Cant Analysis [Main Menu: Form]

Equipment: Canter 1

Analysis variables

| | Variable Name | Per Dimension | | All Dimensions | | Per face |
|---|---|---|---|---|---|---|
| | | Active | Sample | Active | Sample | |
| ☐ | Average: read width (in) | ☑ | | ☐ | 60 | ☐ |
| ☐ | Deviation: read width with respect to PLC target (in) | ☑ | 20 | ☑ | 60 | ☐ |
| ☐ | Number: pieces under low critical value | ☑ | 20 | ☑ | 60 | ☐ |
| ☐ | Number: pieces over high critical value | ☑ | 20 | ☐ | 60 | ☐ |
| ☐ | Deviation: calculated target with respect to read width (in) | ☑ | 100 | ☐ | 60 | ☐ |
| ☐ | Standard deviation: variation within pieces (Sw) (in) | ☑ | 100 | ☐ | 60 | ☐ |
| ☐ | Standard deviation: variation between pieces (Sb) (in) | ☑ | 100 | ☐ | 60 | ☐ |
| ☐ | Standard deviation: Total variation (St) (in) | ☑ | 100 | ☐ | 60 | ☐ |
| △ | Probability: pieces under low threshold value (%) | ☑ | 100 | ☐ | 60 | ☐ |
| ☐ | Probability: pieces over high threshold value (%) | ☑ | 100 | ☐ | 60 | ☐ |
| ☐ | Target: calculates width (in) | | | | | |

Main Menu | Graphics | Results | Alarms

Sawing Variation | Shape Analysis | Positioning | Surface/Cutting | Volumes

FIG. 39A

Parameter used for calculation of this variable:
Low critical deviation (in)

| Dimension | Value |
|---|---|
| All | -0.05 |
| 3 in | -0.05 |
| 4 in | -0.05 |
| 6 in | -0.05 |
| 8 in | -0.05 |

Alarms using this variable:
→ Excessive proportion of pieces under threshold value (PLC=19)

Parameters
Variables
Pieces
Connect

FIG - 39B

Cant Analysis [Main Menu: Form]

Equipment: Canter 1
Retrospect: 100 last

Pieces heading — Stop display

| No piece | Date/time | Status | Nb planes | Idcanter | Nominal width | Centered | Length PLC | Read length |
|---|---|---|---|---|---|---|---|---|
| 1277 | 2005-03-31 10:04:18 | 2047 | 619 | 1 | 4 | -1 | -1.000 | 183.102 |
| 1276 | 2005-03-31 10:04:16 | 2047 | 564 | 1 | 4 | -1 | -1.000 | 177.375 |
| 1275 | 2005-03-31 10:04:13 | 2047 | 647 | 1 | 4 | -1 | -1.000 | 193.402 |
| 1274 | 2005-03-31 10:04:11 | 2047 | 632 | 1 | 4 | -1 | -1.000 | 193.865 |
| 1273 | 2005-03-31 10:04:08 | 2047 | 659 | 1 | 4 | -1 | -1.000 | 194.970 |
| 1272 | 2005-03-31 10:04:05 | 2047 | 639 | 1 | 4 | -1 | -1.000 | 192.691 |
| 1271 | 2005-03-31 10:04:03 | 2047 | 649 | 1 | 4 | -1 | -1.000 | 194.437 |
| 1270 | 2005-03-31 10:04:00 | 2047 | 647 | 1 | 4 | -1 | -1.000 | 193.967 |
| 1269 | 2005-03-31 10:03:57 | 2047 | 645 | 1 | 4 | -1 | -1.000 | 192.037 |
| 1268 | 2005-03-31 10:03:54 | 2047 | 635 | 1 | 4 | -1 | -1.000 | 191.548 |
| 1267 | 2005-03-31 10:03:51 | 2047 | 657 | 1 | 4 | -1 | -1.000 | 192.576 |

Sidebar tabs: Main Menu, Graphics, Results, Alarms

Top tabs: Sawing Variation, Shape Analysis, Positioning, Surface/Cutting, Volumes

FIG. 40A

Selected piece

| No piece | Time stamp | Status | Nb planes | Nominal width | Centered | Length PLC | Read width |
|---|---|---|---|---|---|---|---|
| 1270 | 2005-03-31 10:04:00 | 2047 | 647 | 4 | -1 | -1.000 | 193.967 |

Results per zone

| Zone | Used read | Cancelled read | Aver. width | Aver. dim. deviation | Sum (dim. deviation)2 | Width variance |
|---|---|---|---|---|---|---|
| Total | 818 | 476 | 3.774 | 0.019 | 0.753 | 0.001 |
| Zone 1 | 0 | 42 | 0.000 | 0.000 | 0.000 | 0.000 |
| Zone 2 | 28 | 218 | 3.766 | 0.011 | 0.020 | 0.001 |
| Zone 3 | 554 | 254 | 3.774 | 0.019 | 0.463 | 0.000 |
| Zone 4 | 236 | 4 | 3.773 | 0.018 | 0.270 | 0.001 |
| Zone 5 | 38 | 0 | 3.759 | 0.004 | 0.092 | 0.002 |

SYSTEM AND METHOD OF MONITORING THE QUALITY OF CUTTING

FIELD OF INVENTION

The present invention relates to the field of primary wood processing, and more particularly to the quality control function related to primary cutting of logs into half or full squared cants.

BACKGROUND OF PRIOR ART

In the context of highly competitive market for lumber, monetary loss related to poor quality of produced pieces maybe important. Manufacturers need to promptly react when a problem occurs on a production line. The production of miscut wood pieces at the log cutting stage even during a few minutes, implies high loss for the manufacturers. The continuous control of production lines has become progressively a priority requiring automatic control systems using optical scanning devices for measuring log profile upstream the primary cutting station, for then controlling either log or cutting tool position with respect to geometrical parameters measured. While such systems provide quality and raw material yield improvements as compared with a non-automated production line, accuracy and stability according to which the mechanical feeding devices are capable of positioning logs with respect to cutting tools are limited, which can explain why quality and raw material yield observed in production can be found lower to simulations based on profile data and cutting parameters commanded by the control system used. In particular, underestimation of pieces dimension at the primary or secondary cutting stage generating wood skipping at the planing stage, the overestimation of dimensions with respect to the target dimensions as voluntary applied by the operator contributes to production planing recuts of low commercial value. Some systems available for sawing mills for controlling target dimensions make use of few profile points per each face so as to control some dimensional parameters, without considering other defects related to faces parallelism, knife cutting marks, stripping or roughness. Faces parallelism errors produced at primary and secondary stages also generate wood skipping at planing. Breaking and wear of canter knifes cause stripping, more or less important marks, roughness on full-squared cants and then under-classification of pieces at planing. In order to improve production performance at primary and secondary log cutting stages, the development of improved systems and methods of cutting is still needed.

SUMMARY OF INVENTION

The present invention has a main object of controlling the quality of log cutting either off-line or in real-time, based on optical measurement of half-squared or full-squared cants characteristics as produced at primary or secondary cutting stage, so as to increase the proportion of high-value wood pieces that can be recovered from full squared-cants produced at the sawing stage. The control system and method according to the invention first provide accurate control of target dimensions, while optimizing the adjustment of other quality related parameters such as faces parallelism and cant centering, as well as to measure the level of some surface defects generated at cutting such as knife marks, stripping and roughness, in order to obtain a more complete performance diagnostic. The reduction to practice of the method according to the invention allows to increase the proportion of high-added value, special products such as MSR wood, appearance wood, "select" grade lumber, as well as allows the recuperation of lower grades such as 3 and 4 into higher grades such as 1 and 2. The reduction of overestimation of dimensions with respect to target dimensions allows to increase the quantity of wood chips generated at primary and secondary cutting stages, with higher commercial value as compared to that associated with planing recuts. The concept of the invention allows real-time diagnostics of problems occurring on the production line, such as faces parallelism defect, to promptly take action at the level of mechanical adjustments of feeding device and cutting tools, and to follow the impact of these actions on the quality of produced pieces. By using the method and the system according to the invention, the sawing mill production manager can make a better planning of tools changes such as canter knives to avoid piece quality problems related to breaking and wear (marks, stripping, roughness) in order to limit under-classification thereof. Moreover, the off-centering of full-squared cant in the log, calculated from wane areas distribution, allows performance monitoring of optimization and mechanical systems, improvement of deficient sawing pattern and optimal recovery. The system according to the invention makes use of calibrated vision devices for determining the quality and position of faces as cut on a log by primary and secondary cutting equipment. Such system allows the correction in real time of cutting parameters to produce pieces with reduced tolerance, the display of instructions to the operator for correcting situations of near predetermined limit condition (warnings) or passing beyond these limit conditions (alarms). It also provides database and analysis tools for the assessment of cutting stations performance over various periods. The system performance level is ensured by accuracy of measurement, high data acquisition rate and full processing in real-time.

According to the above objects, from a first broad aspect of the invention, there is provided a cut quality monitoring method for use with a station for cutting a log having raw profile characteristics into a cant having a peripheral surface including at least one pair of opposing cut faces separated by uncut portions. The method comprises the steps of: a) feeding the log lengthwise to the cutting station to produce said one pair of opposing cut faces, while guiding the log substantially in a direction of a machine axis defined by the station; b) measuring the profile of the peripheral surface at a plurality of cross-sections along the machine axis to generate corresponding post-cut profile data; c) estimating the log raw profile characteristics from the post-cut profile data to generate corresponding raw profile data; and d) deriving from the pos-cut profile data and raw profile data, resulting data on at least one parameter related to the cutting quality of the log.

More particularly, the raw profile data includes data defining a longitudinal axis substantially passing through a plurality of cross-section centers along the log, said at least one parameter being a machine off-axis indicating parameter representing positional deviation of the longitudinal axis with respect to the machine axis. Preferably, steps a) to d) above are repeated for a plurality of further logs to obtain resulting data related to the cutting quality of all logs, the method further comprising the step of: e) processing the resulting data to produce resulting statistical data on machine off-axis indicating parameter representing positional deviation of the logs longitudinal axis with respect to the machine axis.

There is also provided a cut quality monitoring method for use with primary and secondary stations for cutting a loq having raw profile characteristics into a cant having a peripheral surface including first and second pairs of opposing cut faces separated by uncut portions, said pairs being substantially mutually perpendiculars with one another. The method comprises the steps of: a) feeding the log lengthwise to the primary cutting station to produce said one pair of opposing cut faces, while guiding the loq substantially in a direction of a machine axis defined by the primary station; b) measuring the profile of the peripheral surface at a plurality of cross-sections along the machine axis to generate corresponding post-cut profile data; c) estimating the log raw profile characteristics from the post-cut profile data to generate corresponding raw profile data; d) deriving from the post-cut profile data and raw profile data, resulting data on at least one parameter related to the cutting quality of said log; e) feeding the loq as cut by the primary cutting station lengthwise to the secondary cutting station to produce said second pair of opposing cut faces, while guiding the cut log substantially in a direction of a further machine axis defined by the secondary station; f) measuring the profile of the peripheral surface including said second pair of opposing cut faces at a plurality of cross-sections along said further machine axis to generate corresponding further post-cut profile data; and g) deriving from all said post-cut profile data and raw profile data, further resulting data on at least one parameter related to the cutting quality of the log.

According to the above objects, from a further broad aspect of the invention, there is provided a system for monitoring the quality of cutting of a log having raw profile characteristics into a cant having a peripheral surface including at least one pair of opposing cut faces separated by uncut portions. The system comprises a primary cutting station receiving the log being conveyed lengthwise therethrough and guiding the log substantially in a direction of a machine axis defined by the station, for producing said one pair of opposing cut faces. The system further comprises at least one profile measuring unit disposed at an outfeed end of the primary cutting station for scanning the peripheral surface at a plurality of cross-sections along the machine axis to generate corresponding post-cut profile data. The system further comprises data processing means for deriving from the profile data an estimation of the log raw profile characteristics to generate corresponding raw profile data, and for deriving from the post-cut profile data and raw profile data, at least one parameter related to the cutting quality of the log.

More particularly, the cant has first and second pairs of opposing cut faces, the pairs being substantially mutually perpendiculars with one another, the primary cutting station being capable of producing the first pair of opposing cut faces. The system further comprises a secondary cutting station disposed for receiving from the primary cutting station the log as cut thereby and being conveyed lengthwise through the secondary cutting station while being guided substantially in a direction of a further machine axis defined by the secondary station, for producing the second pair of opposing cut faces. The system further comprises at least one further profile measuring unit disposed at an outfeed end of the secondary cutting station for scanning the peripheral surface including the second pair of opposing cut faces at a plurality of cross-sections along the machine axis to generate corresponding further post-cut profile data. The data processing means further derives from all said post-cut profile data and raw profile, further resulting data on at least one parameter related to the cutting quality of the log.

BRIEF DESCRIPTION OF THE DRAWINGS

Preferred embodiments of the method and system controlling cutting quality according to the invention will now be described with reference to drawings accompanying the present description in which:

FIG. 3 illustrates the subdivision of a piece into analysis areas;

FIG. 4a illustrates a section of a half-squared cant within a scanning plane;

FIG. 4b illustrates a full-squared cant in section within a scanning plane;

FIGS. 12 to 41 show various screens displayed by the software reducing to practice the concepts of the invention.

DETAILED DESCRIPTION OF THE PREFERRED EMBODIMENTS

Figure 1:
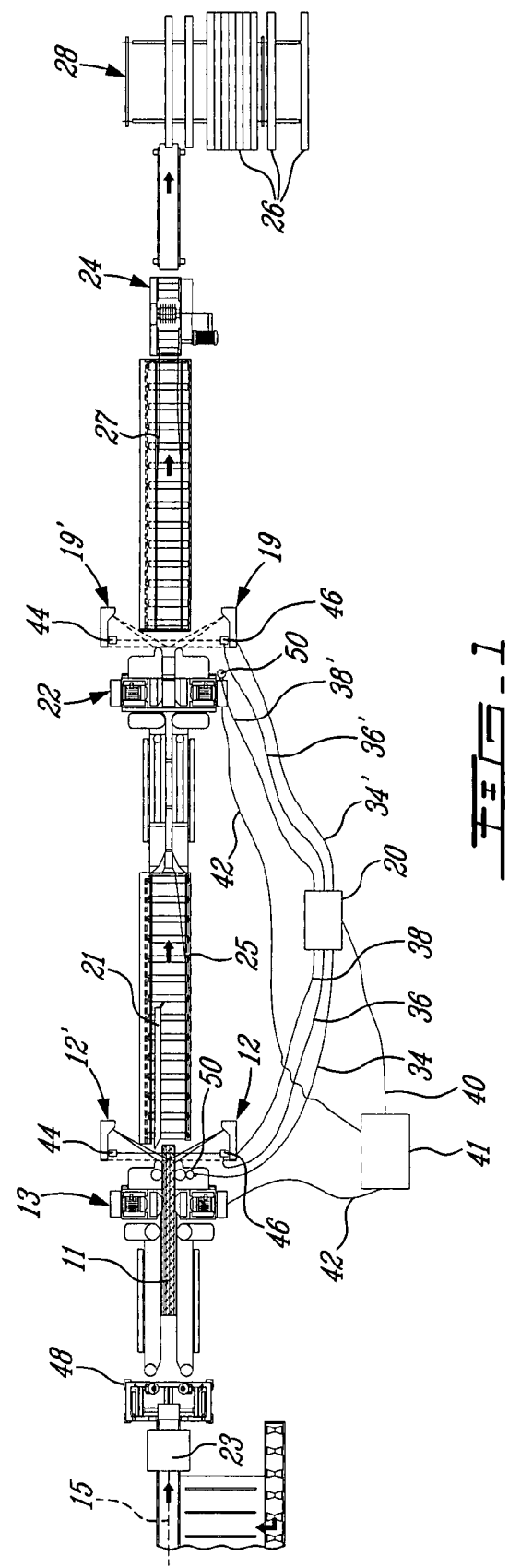
FIG. 1 is a schematic plan view of a preferred embodiment of the system according to the invention, as integrated into a production line performing primary cutting of logs (first station), secondary cutting of half-squared cants (second station) and secondary cutting of full-squared cants (third station) to produce ripped pieces.
Figure 1A:
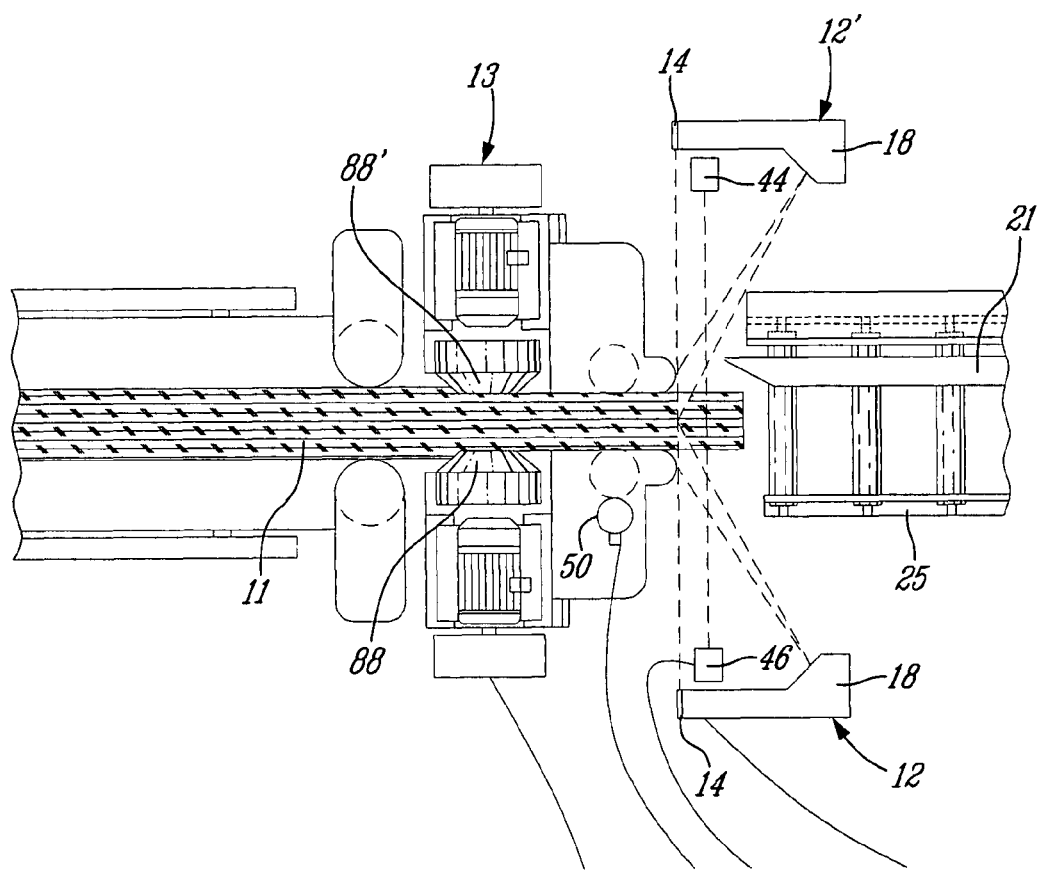
FIG. 1a is a magnified view of the first cutting station shown in FIG. 1.
Figure 2A:
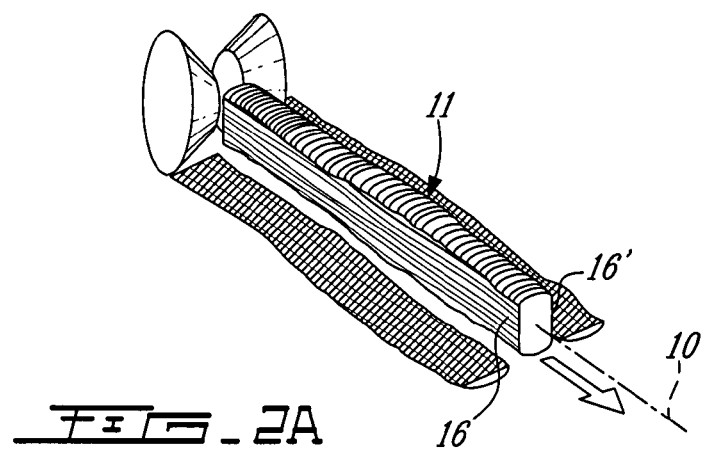
FIG. 2a is a schematic isometric view representing a half-squared cant coming out of the primary cutting station as obtained after squaring of a first pair of opposed faces.
Figure 2B:
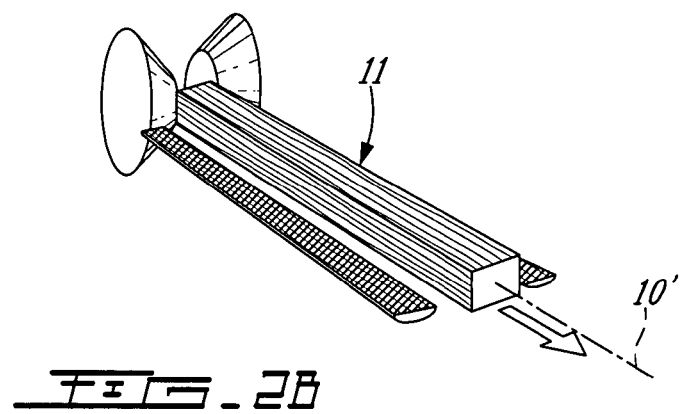
FIG. 2b is a schematic isometric view representing a full-squared cant coming out of the second cutting station (secondary-1) as obtained after squaring of a second pair of opposing faces on the half-squared cant coming from the primary cutting station, which extends substantially perpendicularly to those of the first pair of faces.
Figure 2C:
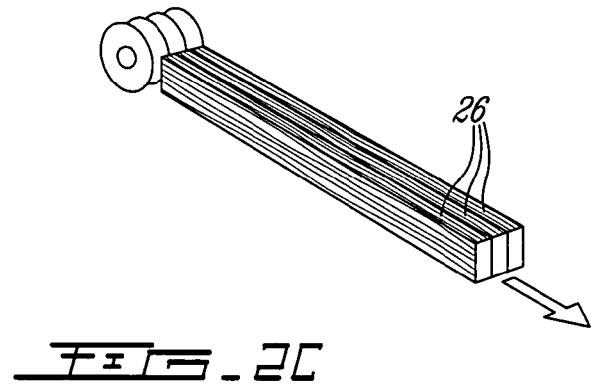
FIG. 2c is a schematic isometric view representing the produced pieces coming out of the third cutting station (secondary-2) as obtained after ripping of a full-squared cant coming from the second cutting station.

So as to perform its function, the system requires measurement data within the plane perpendicular to the half-squared cant or full-squared cant axis, as designated at 10 or 10' on FIGS. 2a and 2c respectively, corresponding substantially to the longitudinal axis of log. This is the measurement plane for diameter, height or width for example, as will be described later in detail. The cutting quality control system according to the invention is provided with at least one profile measurement unit capable of generating profile data related to at least a portion of the cut piece outer surface, including a pair of main profile measurement devices designated 12 and 12' on FIGS. 1 and 1*a* mounted on a rigid structure (not shown), disposed at the outfeed end of the primary cutting station including a first canter 13, in such a manner to be facing with one another at a height and spacing equal with respect to displacement axis 15 of log 11 to be measured. The first station is further provided with a feeding and guiding device at 17 of a conventional design, having a pair of guiding belts 43, 43'. The canter 13 shown is provided with a pair of opposing tools 88, 88' as shown in FIG. 1*a*. The profile measurement units each preferably includes a complementary profile measurement device disposed at respective outfeed ends of canters 13, 22, gathering complementary profile data within a plane perpendicular to that considered for the profile measurement of cut faces, so as to complete the information on the surface portion to be covered by the profile measurement unit, allowing the system to perform some calculations which will be discussed later in detail. Each complementary profile measurement device preferably uses a conventional optical position sensor formed by an optical emitter 44 and an optical receiver 46 (typically infrared), such as model D supplied by Scanmeg Inc. (Boisbriand, Quebec, Canada). In the example of specific production line shown in FIG. 1, a second cutting station including a second canter 22 (secondary cutting-1) is present for producing full-squared cants (4 cut faces) from half-squared cants (2 cut faces) coming from the first canter station 13. For providing a quality control over all operations performed on the production line, the system preferably comprises a second pair of profile measurement devices 19 and 19' identical to devices 12, 12', disposed at the output of second canter 22. In order to associate the data for each profile scanning plane with a corresponding relative position along each scanned piece, the feeding conveyors of canters 13, 22 are each provided with a position encoder 50, generating a signal indicative of piece position during the scanning process, thus allowing to derive the relative position of each scanning plane, knowing the distance separating the encoder and the projecting plane of lasers provided on the devices 12, 12' and 19, 19'. A mechanical turning device 21 as shown on FIGS. 1 and 1*a* and disposed over a transfer conveyor 25 at the output of first canter 13, provides rotation of an exiting half-squared cant produced from log 11 of a 90° angle about displacement axis 15, in such a manner that opposing non-cut faces of half-squared cant 11 be oriented in direction of the tools provided on second canter 22, and so that the faces as cut by the latter on the full-squared cant be oriented toward the profile measurement devices 19, 19' disposed at the ouffeed end of canter 22. According to an alternate production line configuration, so as to comply with the latter requirements, a turning device could be omitted provided the second canter and associated second pair of profile measurement devices are disposed in a perpendicular relationship with respect to the corresponding first canter 13 and profile measurement devices 12,12' of the first cutting station. The production line shown includes a third cutting station (secondary-2) including a multiple saw 24 receiving via a transfer conveyor 27 the full-squared cants coming from the second canter 22, for producing there from ripped pieces 26 as shown on FIG. 2*c*, which are discharged on a transverse conveyor 28 disposed at the ouffeed end of the production line. The profile measurement devices 12, 12' allow to generate the profile measurement data of the cut faces and their position within space. These devices preferably make use of the well-known laser triangulation principle, according to which a laser source 14 projects a linear beam toward the piece surface to be measured, such as one of opposing cut faces 16 and 16' of cant 11 illustrated on FIG. 2*a*, to form a laser line thereon, a digital camera 18 such as shown on FIG. 1*a* whose vision axis forms an angle with the projection plane of the laser line, capturing reflected light for generating an image allowing to derive dimensional information. A commercially available digital camera capable of working at an acquisition rate of more of 250 images/sec can be used. The proximity or remoteness of the reflecting surface with respect to the camera, which is related to a transverse displacement of corresponding image positions of the laser line as reflected on that surface, may be thus quantitatively measured. The use of a pair of profile measurement device 12, 12' being in facing relationship with one another and calibrated on the basis of a common spatial reference plane, allows to measure the distance between two opposing faces or points thereof. The position of laser source 14 and camera 18 must be rigorously fixed to obtain a uniform scanning scale for use period. The calibration required to establish the scale of displacement units for laser line position within the measurement plane, with respect to observed displacement on the image captured by each camera, may be realized with the help of any appropriate calibration grid, by applying corrections required to obtain uniform accuracy on distance measurements in the whole vision field of each camera.

The system comprises the control and data processing unit generally designated at number 20 on FIG. 1, which includes the computers performing analysis and display programs as well as the communication ports for the external components (profile measurement devices, canter feeding encoder) linked thereto via lines 34, 36, 38 for the components associated with the first cutting station, and lines 34', 36', 38' for the components associated with the second cutting station, as well as the electrical supply. The control and data processing unit 20 also comprises an operation management computer containing principally the analyzed results database and including devices for commands and data entry (keyboard-mouse), for displaying (screen) and for commutation to provide access to each one of system computers. From that station, one may use data processing or displaying programs and control the other computers of the control and data processing unit 20 interconnected in network, by using communication software provided with a "master-slave" function such as PC-Anywhere™. Some secondary display stations may be used for transmitting alarms and instructions to the plant operator, or for defining production parameters via line 40 linked to the plant programmable logic controller (PLC) at 41, which controls, among others, the operation of canters 13 and 22 via lines 42. The software is preferably programmed in several modules controlling the communication of information between cameras 18 and the various screens of display stations intended to the operators, some being accessible only via the system administrator through an interface programmed to this task.

The first software module (storage module) governs position and primary processing of images from cameras 18. All portions of laser line activating the sensors (pixels) of cameras 18 within the image plane are associated with precise coordinates by interpolating between active pixels, generating image data that are stored into the database. Processing performed on the data for each piece will now be described based on input and output variables definitions as well as on the piece zones where the calculation are applied. The input variables are presented in Table 1, which originate either from data generated by profile measurement devices 12, 12' for each half-squared cant, or from data generated by profile measurement devices 19, 19' for each full-squared cant. Table 1 associates with each listed variable an indication "Per face", "Per plane" or "Global". The indication "Per face" qualifies data acquired in relation to either left of right faces independently. The indication "Per plane" qualifies data acquired at each image scanning. These data are referenced within the scanning plane, and typically include differential measurement using information associated with opposing cut faces (left or right). Finally, the indication "Global" qualifies data that apply to the inspected piece as a whole.

respectively associated with general information/heading (Table 2a) and with analysis functions of sawing variation (Table 2b), of shape (Table 2c), of positioning (Table 2d), of surface/cutting (Table 2e) and of volumes (Table 2f).

TABLE 1

| Description | Variable Name | Per face | Per plane | Global | Unit | Range |
|---|---|---|---|---|---|---|
| Piece number | DPliNoPiece | | | X | Integer | |
| Status | DphrStatut | | | X | | Binary |
| Start stamp | DpetiquetteDebut | | | X | Date H:M:S:m | |
| End stamp | DPetiquetteFin | | | X | Date H:M:S:m | |
| Canter identification | DPiIdCanter | | | X | Integer | 1-2 |
| Centered pattern | DPiPatronCentre | | | X | Yes/No | Binary |
| Length read | DPfLongueurLue | | | X | Inch | 0-256 |
| Length PLC | DPfLongueurPLC | | | X | Inch | 0-256 |
| Number of planes | DpiNbPlans | | | X | Integer | 0-1000 |
| Knife marks probability | DPfProbCouteaux | X | | X | Probability | 0-1 |
| Plane status | DplStatut | X | X | | | Binary |
| Plane position | DpfPositionPo | | X | | Inch | 0-256 |
| Top width | DpfLargeurHaut | | X | | Inch | 0-24 |
| Center width | DpfLargeurCentre | | X | | Inch | 0-24 |
| Bottom width | DpfLargeurBas | | X | | Inch | 0-24 |
| Log height (half-squared cant)/ full-squared cant | DpfHauteur | | X | | Inch | 0-24 |
| Estimated infeed area | DpfAireEstimeEntree | | X | | Square inch | 0-512 |
| Measured area | DpfAireMesureSortie | | X | | Square inch | 0-512 |
| Parallelism | DpfParallelisme | | X | | Degree | −45-45 |
| Squaring | DpfEquerrage | | X | | Degree | −45-45 |
| Positioning X | DpfEcartAxeX | | X | | Inch | −10-10 |
| Positioning Y | DpfEcartAxeY | | X | | Inch | −10-10 |
| Top corner X | DpfCoudeHautX | X | X | | Inch | −x-x |
| Top corner Y | DpfCoudeHautY | X | X | | Inch | −x-x |
| Bottom corner X | DpfCoudeBasX | X | X | | Inch | −x-x |
| Bottom corner Y | DpfCoudeBasY | X | X | | Inch | −x-x |
| Roughness RMS | DpfRgosite | X | X | | Inch | 0-0.250 |
| Tear — width | DpfArrLargeur | X | X | | Inch | 0-24 |
| Tear — depth | DpfArrProfondeur | X | X | | Inch | 0-6 |
| Tear — occurrence | DpiArrNbOccurences | X | X | | Integer | 0-50 |
| Top wane | DpfFlacheHaut | X | X | | Inch | 0-24 |
| Cut surface | DpfFlacheSurface | X | X | | Inch | 0-24 |
| Bottom wane | DpfFlacheBas | X | X | | Inch | 0-24 |

The image data constituting output variables that are stored into the database are presented into the following tables, TABLE 2a

| Description | Calculations | Output variables Heading | Application | | | Unit | Range |
| | | | Face | Zone | Filter | | |
|---|---|---|---|---|---|---|---|
| Piece number | DpINoPiece | BDNoPiece | | | | Integer | |
| Time stamp | DB insertion time | BDEtiquetteTemps | | | | Date H:M:S:msec | |
| Status | DplStatut | BDStatut | | | | | Binary |
| Canter identification | DplIdCanter | BDIdCanter | | | | Integer | 1-2 |
| Number of planes | DplNbPlans | BDNbPlans | | | | Integer | 0-1000 |
| Nominal width | Comparison of BDLargeurMoy (ZONE 3) of whole piece with a reference table | BDLargeurNominale | | | | Inch | 0-24 |
| Centered pattern | DplPatronCentre | BDPatronCentre | | | | Yes/No | Binary |
| Length read | DpdLongueurLue | BDLongueurLue | | | | Inch | 0-256 |
| Length PLC | DPdLongueurPLC | BDLongueurPLC | | | | Inch | 0-256 |

TABLE 2b

| | Sawing variation | | | | | | |
|---|---|---|---|---|---|---|---|
| Number of readings used | Sum of readings used for variables calculation | BDNbLectUtiliseesVar | X | X | Integer | 0 @ 1000 |
| Number of readings cancelled | Sum of readings cancelled for calculation | BDNbLectElimineesVar | X | X | Integer | 0 @ 1000 |
| Widths average | $\overline{Largeurs_i}$ with Largeurs: DPdLargeur Haut$_i$, DPdLargeurBas$_i$ | BDLargeurMoy | X | X | Inches | 0 @ 24 |
| Average dimensional variation | $\overline{(Largeurs_i-Cible)}$ with Largeurs: DPdLargeur Haut$_i$, DPdLargeur Bas$_i$ | BDEcartDimMoy | X | X | Inches | −12 @ 12 |
| Square of dimensional variations | $\sum (Largeurs_i - Cible)^2$ with Largeurs: DPdLargeur Haut$_i$, DPdLargeurBas$_i$ | BDSomEcartDimCarre | X | X | Square inch (?) | −1 M @ 1 M |
| Width variance used | $\dfrac{\sum (Largeurs_i - BDLargeurMoy)^2}{BDNbLectUtiliseesVar}$ with Largeurs: DPdLargeur Haut$_i$, DPdLargeurBas$_i$ | BDVarianceLargeurs | X | X | Square inch (?) | 0 @ 1 |
| Width standard-variation For display only | $\sqrt{BDVariance\ Largeurs}$ | — | X | X | Inch | 0 @ 1 |

TABLE 2c

| | Shape analysis | | | | | | |
|---|---|---|---|---|---|---|---|
| Number of readings used | Sum of readings used for variables calculation | BDNbLectUtiliseesForme | X | X | Integer | 0 @ 1000 |
| Number of readings cancelled | Sum of readings cancelled from calculations | BDNbLectElimineesForme | X | X | Integer | 0 @ 1000 |
| Parallelism (bevel) | $\overline{DPdParallelisme_i}$ | BDParallelismeMoy | X | X | Degree | −45 @ 45 |
| Squaring | $\overline{DPdEquerrage_i}$ | BDEquerrageMoy | X | X | Degree | −45 @ 45 |
| Taper | Slope of linear regression applied to width value taken from DPdL arg eurCentre$_i$ | BDEffilement | X | X | Inch/foot | −10 @ 10 |
| Ripple | Best fit of a sinusoneidal function of type $F(x) = a \sin\left(\dfrac{2\pi x b}{l}\right) + c$ where l is the DPdLongueurLue, a and b are output values (a amplitude in thousandth, b number of ripple per piece) and x represents DPdL arg eurCentre$_i$ must be accompanied by a correlation coefficient r to be defined | BDOndulationAmp BDOndulationCorr BDOndulationNombre | | X | | |

TABLE 2d

| | Positioning analysis | | | | | |
|---|---|---|---|---|---|---|
| Number of readings used | Sum of readings used for variables calculation | BDNbLectUtiliseesPos | X | Integer | 0–1000 |
| Number of readings cancelled | Sum of readings cancelled from calculations | BDNbLectElimineesPos | X | Integer | 0–1000 |
| Rotation, Error | ArcTan(1 / slope of linear regression on values of $\overline{DPdEcartAxeX_i}$ (corrected of log angle) with respect to values of $\overline{DPdEcartAxeY_i}$) | BDRotationErreur | X | Degree | −90–90 |
| Rotation, Correlation | Correlation coefficient of linear regression on values of $\overline{DPdEcartAxeX_i}$ (corrected of log angle) with respect to values of $\overline{DPdEcartAxeY_i}$ | BDRotationCorrelation | X | — | −1–1 |
| Rotation, sweep | Non used for the moment | BDRotationFleche | X | Inches | 0–24 |
| Average deviation X | $\overline{DPdEcartAxeX_i}$ | BDEcartAxeXMoy | X | Inches | −10–10 |
| Average deviation Y | $\overline{DPdEcartAxeY_i}$ | BDEcartAxeYMoy | X | Inches | −10–10 |
| Angle log XZ | Slope of linear regression on values of DPdEcartAx eX$_i$ along the Z axis (travel axis). Multiplied by 12 (in/ft) | BDAngleBilleXZ | X | In/ft | −10–10 |
| Top end offset (with respect to machine axis) | Y-coordinate at origin of linear regression line applied on values of DPdEcartAx eX$_i$ along Z axis (travel axis) | BDEcartFinBout | X | Inches | −10–10 |

TABLE 2e

Surface/cutting analysis

| | | | | | | |
|---|---|---|---|---|---|---|
| Number of readings used | Sum of readings used for variables calculation | BDNbLectUtiliseesSurf | X | | Integer | 0–1000 |
| Number of readings cancelled | Sum of readings cancelled from calculations | BDNbLectElimineesSurf | X | | Integer | 0–1000 |
| Knife mark probability | DPdProbCouteaux | BDProbCouteaux | X | | Probability | 0–1 |
| Average roughness | $\overline{DPdRugosite_i}$ | BDRugositeMoy | X | X | Inch | 0–0.250 |
| Tear, average number of occurrences per plane | $\overline{DPlArrNbOccurences_i}$ where DPlArrNbOccurences$_i \neq 0$ | BDArrNbOccMoy | X | X | Number | 0–50 |
| Tear, total area | $\sum DPdArrLargeur_i * pasLecture_i$ where pasLecture$_i$ = DPdPositio nPo$_i$ − DPdPositio nPo$_{i-1}$ | BDArrSurfaceTotale | X | X | Square inch | 0–1000 |
| Tear, average depth | $\overline{DPdArrProfondeur_i}$ | BDArrProfMoy | X | X | Inch | 0–2 |
| Cut area | $\sum (DPdSurfaceUsinee_i * pasLecture_i)$ where pasLecture$_i$ = DPdPositio nPo$_i$ − DPdPositio nPo$_{i-1}$ | BDSurfaceUsinee | X | X | Square inch | 0–5000 |

TABLE 2f

Volumes

| | | | | | | |
|---|---|---|---|---|---|---|
| Number of readings used | Sum of readings used for variables calculation | BDNbLectUtiliseesVol | X | | Integer | 0–1000 |
| Number of readings cancelled | Sum of readings cancelled from calculations | BDNbLectElimineesVol | X | | Integer | 0–1000 |
| Infeed estimated volume | $\sum (DPdAireEstiméEntree_i * pasLecture_i)$ where pasLecture$_i$ = DPdPositio nPo$_i$ − DPdPositio nPo$_{i-1}$ | BDVolumeEstimeEntree | | | Cubic inch | 0–120K |
| Outfeed measured volume | $\sum (DPdAireMesureSortie_i * pasLecture_i)$ where pasLecture$_i$ = DPdPositio nPo$_i$ − DPdPositio nPo$_{i-1}$ | BDVolumeMesureSortie | X | | Cubic inch | 0–100K |
| Average height | $\overline{DPHauteur_i}$ | BDHauteurMoy | X | | Inch | 0–24 |

Figure 31:
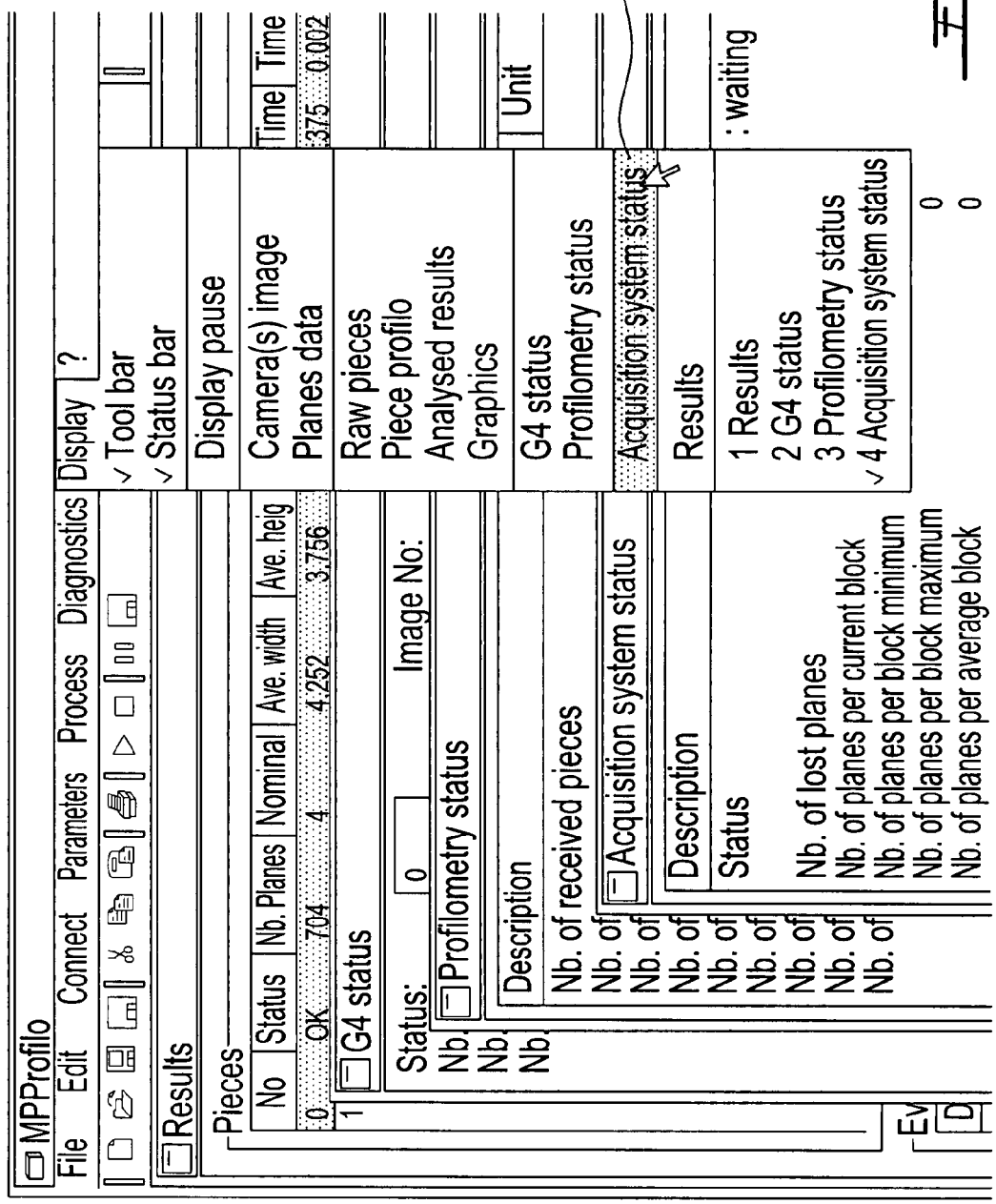
Figure 32:
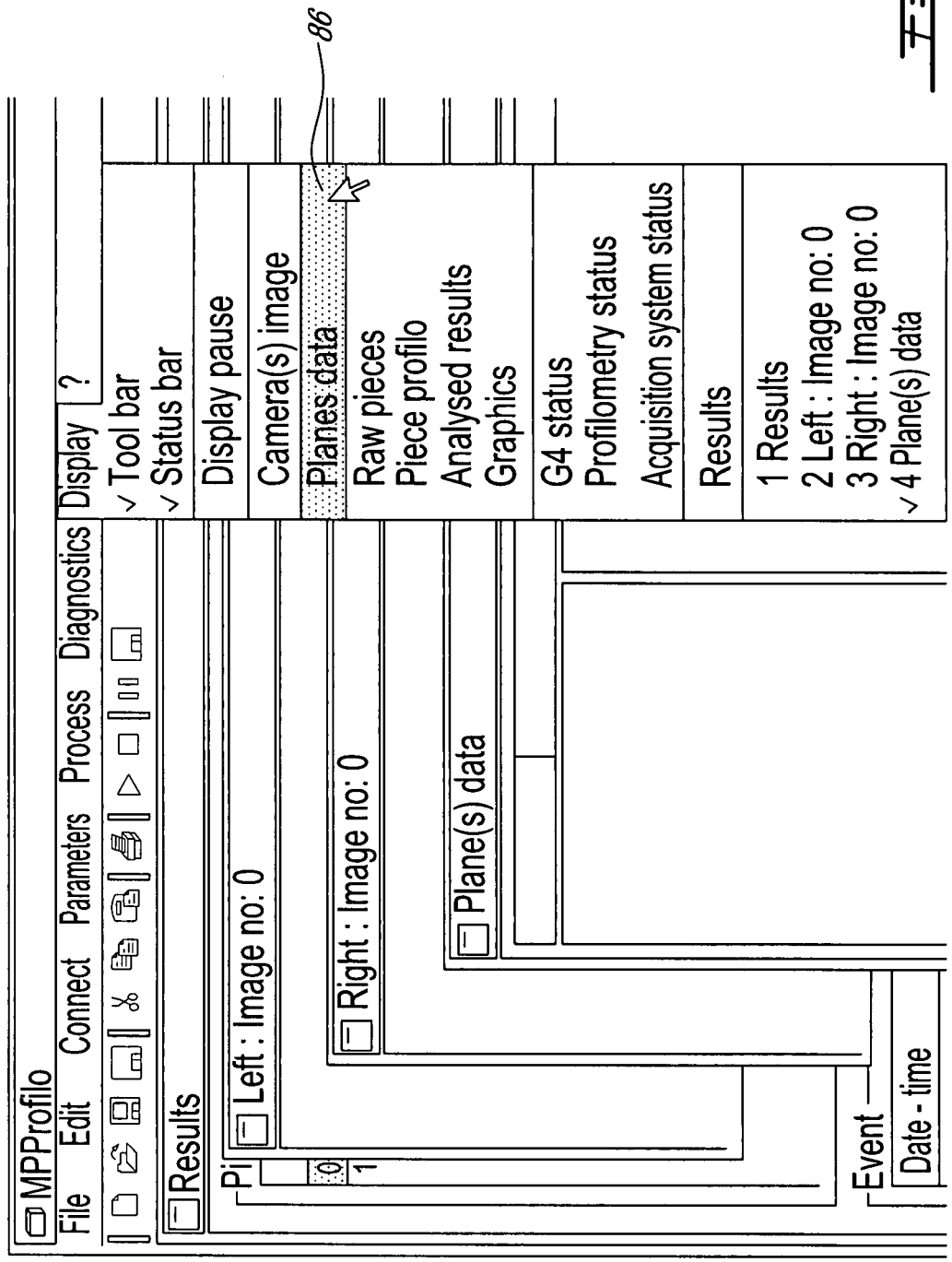
Figure 33A:
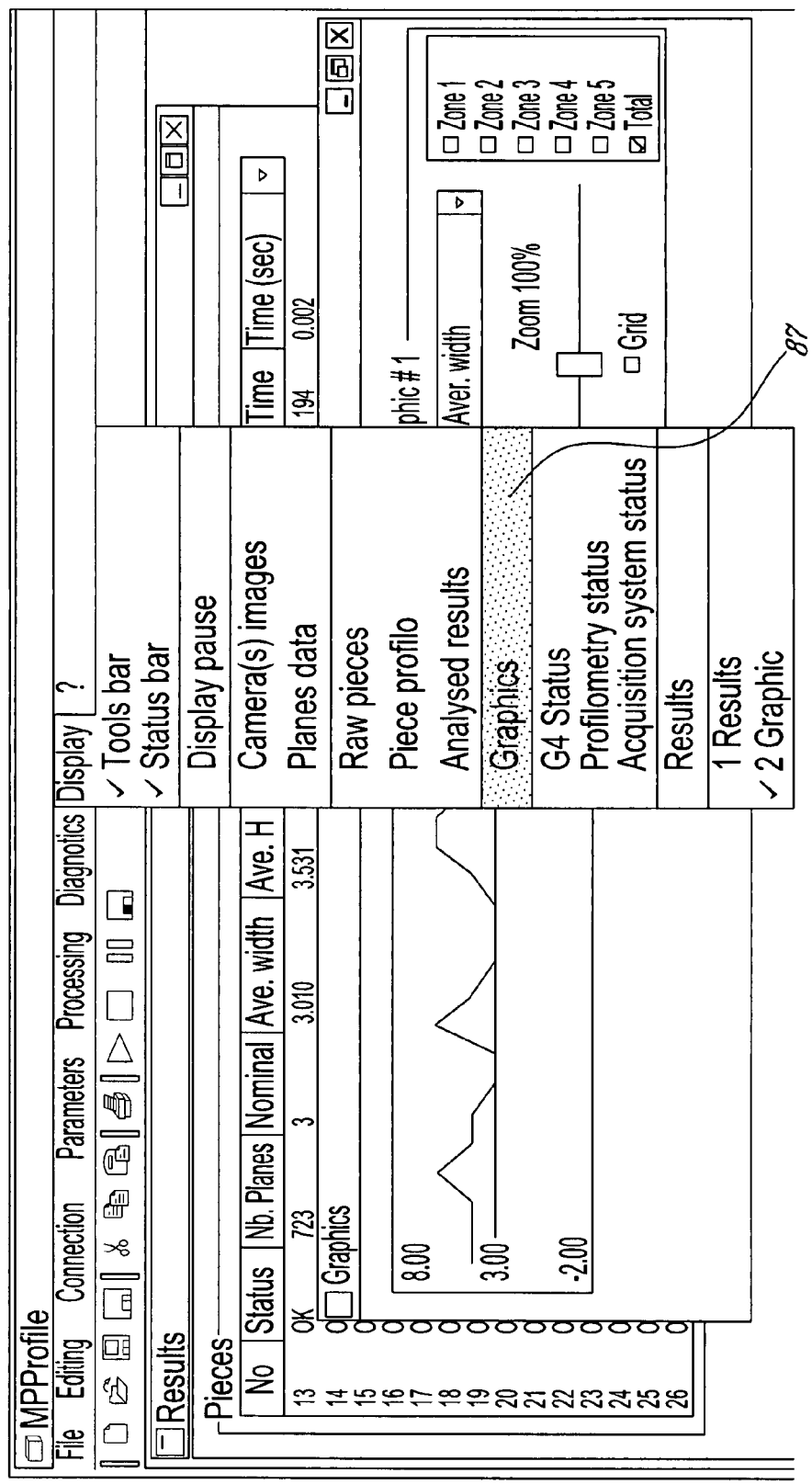
Figure 33B:
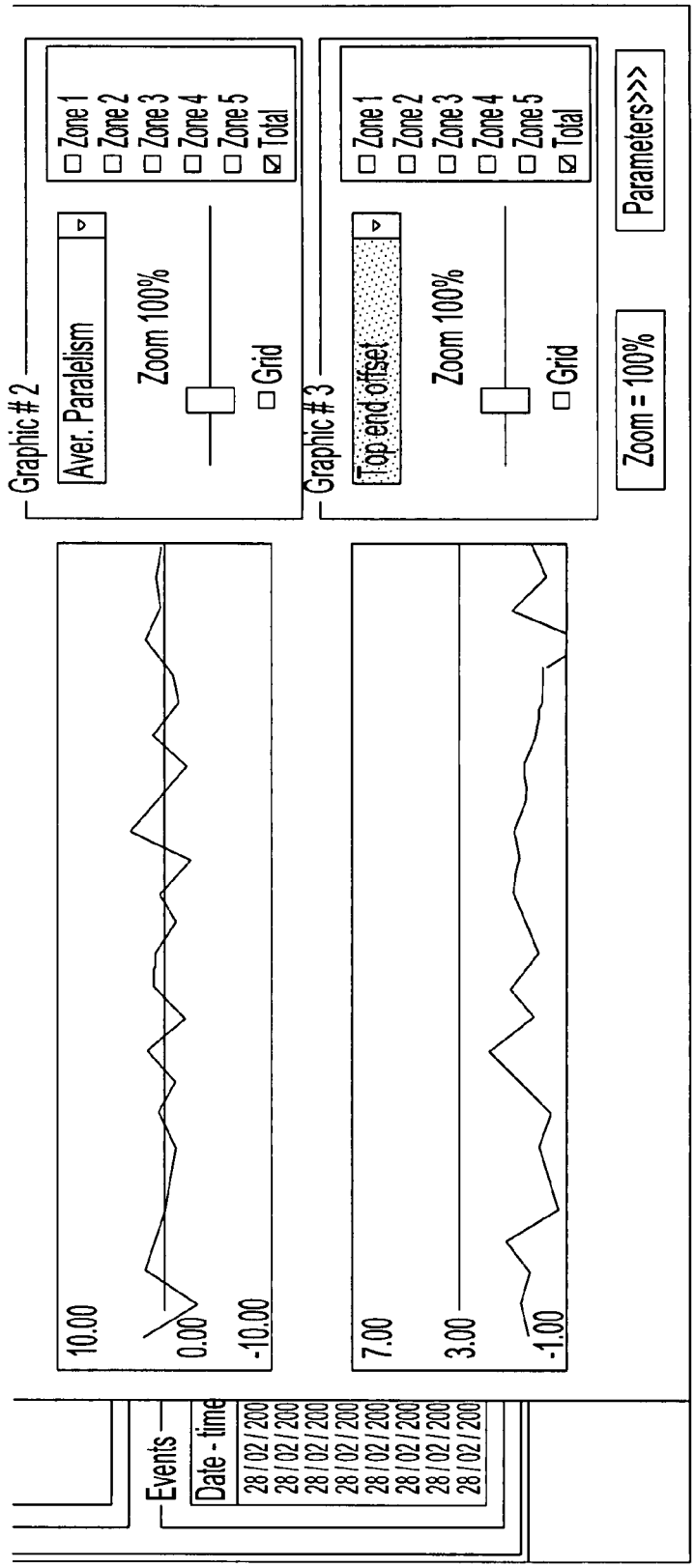

Even if most of input variables and output variables calculations is preferably generated by programs executed by the processors integrated into profile measurement devices 12, 12' and 19, 19', it should be understood that some of these calculations could otherwise be performed by the analysis modules of the system computers. For logical reasons, the calculations requiring knowledge of data on corners 29, 29', 30, 30' as indicated on the half-squared cant shown on FIG. 4*a* and 31, 31' 32, 32' as indicated on the full-squared cant shown on FIG. 4*b* are preferably performed at the profile measurement devices level, the other calculations being performed by the analysis module loaded in the system computers.

The position of corners and the detection of many of the surface defects mentioned above are preferably obtained using an improvement of the method described in U.S. Pat. No. 6,122,065 issued to the present applicant, that improved method being explained as follows:

(1) The equation of a reference regression line is calculated from centroid points generated by the profile measurement devices;

(2) The points laying beyond a predetermined threshold on that reference line, thus not belonging to the regular portion of the inspected surface, are cancelled;

(3) The two preceding steps are repeated at N times running. At each one of iterations, the points cancellation threshold is preferably decreased in order to exclude still more points from one iteration to another;

(4) The equation of a final regression line is calculated from the remaining centroid points. The points corresponding to top and bottom corners are seek by finding the first top and bottom centroids remaining after step 1) to 3). For one centroid to be considered as a corner, it is required that M adjacent centroids be correct. Briefly stated, a centroid originating from split-wood or other defect cannot be considered as a corner. There must be a given predetermined number M of adjacent centroids to conclude the probability that the centroid concerned be part of a fine surface. When the fine surface is very narrow or inexistent for a given plane, the convergence rate of that step, i.e. a number of iterations required at step 3), becomes an important parameter. When the number of iterations is small, many points are cancelled at each iteration. Since a cancelled point is not reconsidered afterward, this reduces the accuracy of fine surface calculation. Moreover, it is then possible that the regression line "sticks" to a region which is in fact wane or non-cut zone. Consequently, it is important to leave that parameter sufficiently large, ideally of the order of 20 terations. The calculation of corners may not give accurate results in the case where the fine surface is very small. Indeed, the regression line parameters are then calculated with an eventually too small sample. Considering that sufficient data at the piece level are available, a plane whose fine surface is too small (i.e. for which the number of points entering into the regression line calculation is below a predetermined threshold) is merely invalidated and does not enter in subsequent calculations. Consequently, it frequently occurs that some planes found at top and bottom of the log be invalidated.

In order to ensure a better quality control, each inspected piece 11 is preferably subdivided in five zones as illustrated on FIG. 3 according to the piece travel direction toward arrow 57. The piece dimension being entered by the operator, for each one of nominal widths entered is found a minimal and maximal value for which the average width (within zone 3) of each log is compared to determine the nominal width, according to the example represented in Table 3.

TABLE 3

| Nominal width | Target value | Minimal value | Maximal value | Necessary flat area |
|---|---|---|---|---|
| 3 | 2.81 | 1 | 3.2 | 0.5 po |
| 4 | 3.755 | 3.5 | 4.1 | 1 po |
| ... | ... | ... | ... | ... |

The operator must also enter the target value for deviations calculations as well as the flat surface required to ensure validity of the readings as obtained with a digital filter programmed into the software applying on data as specified by the operator. That filter operates if the cut area is below a parameter stored into the system.

The second module (analysis module) plays a central role into the system, coordinating the transfer of data, completing all calculations and analysis thereof, for then store the results into the database provided on the operation management computer. That module is subdivided according to characteristics of the analysis functions, namely sawing variations analysis, shape analysis, positioning analysis as well as surface and cutting analysis. The dimensions used by the system must be entered as general parameters thereof. Hence, the target values must correspond to those entered for the calculation of output values stored in the database, according to the example of Table 4.

TABLE 4

| Nominal width | Dimension name | Target value | Low critical value | High critical value |
|---|---|---|---|---|
| 3 | 3 in | 2.81 | 2.75 | 2.95 |
| 4 | 4 in | 3.755 | 3.60 | 3.85 |
| ... | ... | ... | ... | ... |

The input variables of the analysis module come from the database as calculated by the storage module. Some other parameters required to the analysis and provided by the operator are also considered as inputs, identified by a prefix "IA" in the following. All of these input variables are defined in Table 5.

TABLE 5

| Description | Variable name | Per width |
|---|---|---|
| Sawing variation | | |
| Deviation from low critical target (calculated with critical dimensions) | IAEcartDimInf | X |
| Deviation from high critical target (calculated with critical dimensions) | IAEcartDimSup | X |
| Tolerated percentage below IAEcartDimInf | IAPctSousEcartDimInf | X |
| Shape analysis variation | | |
| Definition value of maximal parallelism | IAParallelismeMax | X |
| Definition value of maximal taper | IAEffilementMax | X |
| Definition value of maximal squaring | IAEquerrageMax | X |
| Positioning analysis | | |
| Distance value from cutting front to belt front support | IADistanceCourte | X |
| Distance value from cutting front to belt rear support | IADistanceLongue | X |
| Acceptance threshold for rotation errors (min. correlation) | IACorrelationMin | X |
| Surface/cutting analysis | | |
| Definition value of maximal roughness | IARugisiteMax | X |
| Definition value of knife marks maximal probability | IAProbCouteauxMax | X |
| Definition number of maximal number of tear occurrences | IAArrNbOccMax | X |
| Definition value of maximal tear area | IAArrSurfaceMax | X |
| Definition value of maximal tear depth | IAArrProfMax | X |
| Volumes | | |
| Definition value of maximal chips percentage | IAPctCopeauxMax | X |

The typical output variables of the analysis module, identified by prefix "A", are presented in the following tables, respectively associated with analysis functions of sawing variation (Table 6a), of shape (Table 6b), of positioning (Table 6c), of surface/cutting (Table 6d) and of volumes (Tables 6e). Preferably, the relevant data are filtered, for example, by excluding those for which percentage (%) of fine surface with respect to diameter is below a value specific to each one of widths. In these tables, indication "Per width" is associated with data that apply to group of pieces whose nominal width is identical, while indication "All widths" is associated with data that apply to a group of pieces-all nominal widths mixed-up.

TABLE 6a

| Description | Calculations | Output variables | Application | | | | Unit | Range |
| | | | Per face | Per zone | Per widt. | All widt. | | |
|---|---|---|---|---|---|---|---|---|
| Sawing variation (part 1) | | | | | | | | |

TABLE 6a-continued

| Description | Calculations | Output variables | Application Per face | Per zone | Per widt. | All widt. | Unit | Range |
|---|---|---|---|---|---|---|---|---|
| Average width | $\dfrac{\sum (BDLargeurMoy_i * BDNbLectUtilisees_i)}{\sum BDNbLectUtilisee_i}$ | AlargeurMoy | | X | X | | | |
| Average dimension deviation | $\dfrac{\sum (BDEcartDimMoy_i * BDNbLectUtiliseesVar_i)}{\sum BDNbLectUtiliseesVar_i}$ | AecartDimMoy | | X | X | X | | |
| Standard deviation on a piece (within, sw) | $\sqrt{\dfrac{\sum BDVarianceLargeurs_i}{nbPlanches}}$ | AdimSW | | X | X | X | | |
| Standard deviation between pieces (between, Sb) | $\sqrt{\dfrac{\sum (BDEcartDimMoy_i - \overline{BDEcartDimMoy})^2}{nbPlanches-1}}$ | ADimSB | | X | X | X | | |
| Total standard deviation, St | $\sqrt{\left(\dfrac{\sum BDSomEcartDimCarre_i}{\sum BDNbLectUtiliseesVar_i}\right) - AEcartDimMoy^2}$ | ADimST | | X | X | X | | |
| Dimensional deviation, number below low critical value | Nombre($BDEcartDimMoy_i < IAEcartDimInf$) | AecartDimNbSousInf | | X | X | X | | |
| Dimensional deviation, number above high critical value | Nombre($BDEcartDimMoy_i > IAEcartDimSup$) | AEcartDimNbDessusSup | | X | X | X | | |

(part 2)

| Description | Calculations | Output variables | Per face | Per zone | Per widt. | All widt. | Unit | Range |
|---|---|---|---|---|---|---|---|---|
| Probability of piece below low critical dimensional deviation | $0.5 - \displaystyle\int_{IAEcartDimInf}^{AEcartDimMoy} \dfrac{1}{ADimST\sqrt{2\pi}} * e^{\frac{-(x-AEcartDimMoy)^2}{2*(ADimST)^2}}$ | AProbSousEcartDimInf | | X | X | X | | |
| Probability of piece over high critical dimensional deviation | | AProbDessusEcartDimSup | | X | X | X | | |
| Deviation from the calculated dim target | IAEcartDimInf − V With: $\displaystyle\int_{v}^{AEcartDimMoy} e^{-(x-AEcartDimMoy)^2/2*(ADimST)^2} =$ $ADimST\sqrt{2\pi}\,(0.5 - IAPctSousEcartDimInf)$ | AEcartDimCibleCalculee | | | X | X | | |
| Suggested target | AEcartDimCibleCalculee + AEcarDimMoy + Cible | ACibleSuggeree | | | | | | |

TABLE 6b

| Shape analysis | | | | | | |
|---|---|---|---|---|---|---|
| Parallelism, number above maximal value | $Nombre(BDParallelismeMoy_i > IAParallelismeMax)$ | AParallelismeNbDessusMax | X | X | X | |
| Average parallelism | $\dfrac{\sum (BDParallelismeMoy_i * BDNbLectUtiliseesForme_i)}{\sum BDNbLectUtiliseesForme_i}$ | AParallelismeMoy | X | X | X | |
| Parallelism standard deviation | $\sqrt{\dfrac{\sum (BDParallelismeMoy_i - \overline{BDParallelismeMoy})^2}{nbPlanches - 1}}$ | AParallelismeS | X | X | X | |
| Squaring, number above maximal value | $Nombre(BDEquerrageMoy_i > IAEquerrageMax)$ | AEquerrageNbDessusMax | X | X | X | |
| Average squaring | $\dfrac{\sum (BDEquerrageMoy_i * BDNbLectUtiliseesForme_i)}{\sum BDNbLectUtiliseesForme_i}$ | AEquerrageMoy | X | X | X | |
| Squaring, standard deviation | $\sqrt{\dfrac{\sum (BDEquerrageMoy_i - \overline{BDEquerrageMoy})^2}{nbPlanches - 1}}$ | AEquerrageS | X | X | X | |
| Number taper | $Nombre(ABS(BDEffilement_i) > IAEffilementMax)$ | AEffilementNbDessusMax | X | X | X | |
| Average taper | $\overline{BDEffilement_i}$ | AEffilementMoy | X | X | X | |
| Taper, standard deviation | $\sqrt{\dfrac{\sum (BDEffilement_i - \overline{BDEffilement})^2}{nbPlanches - 1}}$ | AEffilementS | X | X | X | |

TABLE 6c

| Positioning analysis | | | | | | |
|---|---|---|---|---|---|---|
| Rotation: Average weighted error | $BDRotationErreur_i * \sqrt{ABS(BDRotationCorr_i)}$<br>For all $BDRotationCorr_i > IACorrelationMin$ | ARotationMoy | | X | X | degree |
| Rotation: standard-deviation | $\sqrt{\dfrac{\sum \left( (BDRotationErreur_i * \sqrt{ABS(BDRotationCorr_i)}) - ARotationMoy \right)^2}{nbPlanches - 1}}$<br>For all $BDRotationCorr_i > IACorrelationMin$ | ARotationS | | X | X | degree |
| Log angle XZ: Average | $\overline{BDAngleBilleXZ_i}$ | AAngleBilleMoy | X | X | X | in/ft |
| Log angle XZ: Standard-deviation | $\sqrt{\dfrac{\sum (BDAngleBilleXZ_i - \overline{BDAngleBilleXZ})^2}{nbPlanches - 1}}$ | AAngleBilleS | X | X | X | in/ft |
| Distance from log pivot to cutting front: Average | Slope in linear regression of BDEcartFinBout (Y) vs BDAngleBilleXZ (X) (divided per 12) | AdistancePivotMoy | X | X | X | In |
| Distance from log pivot to cutting front: Standard deviation | Correlation coefficient in linear regression of BDEcartFinBout (Y) vs BDAngleBilleXZ (X) (divided per 12) | ADistancePivotS | X | X | X | In |
| Distance between log pivot and machine axis: Average | Y-coordinate at origin in linear regression of BDEcartFinBout (Y) vs BDAngleBilleXZ (X) (divided per 12) | AEcartPivotMoy | X | X | X | In |
| Distance between log pivot and machine axis: Standard deviation | Standard-deviation of deviations according the linear regression line used to find the pivot where $\text{Écart}_x = BDEcartFinBout_i - Régression_x$ | AEcartPivotS | X | X | X | In |
| Front support distance for correcting off-axis: Average | $(IADistanceCourte - ADistancePivotMoy) * AAngleBilkMoy$ | ASupportAvantMoy | X | X | X | In |
| Rear support distance for correcting off-axis: Average | $(IADistanceLongue - ADistancePivotMoy) * AAngleBilkMoy$ | ASupportArriereMoy | X | X | X | In |

TABLE 6c-continued

| | | Positioning analysis | | | | | |
|---|---|---|---|---|---|---|---|
| Top end position at cutting front: Average | −ADistancePivotMoy* AAngleBilkMoy | APositionFinBoutMoy | X | X | X | | ln |

TABLE 6b

| | | Surface and cutting analysis | | | | | |
|---|---|---|---|---|---|---|---|
| Knife marks, number above maximal value | Nombre(BDProbCouteaux$_i$ > IAProbCouteauxMax) | AProbCouteauxNbDessusMax | X | * | X | X | |
| Knife marks, probability average | $\overline{BDProbCouteaux_i}$ | AProbCouteauxMoy | X | * | X | X | |
| Roughness, number above maximal value | Nombre (BDRugosite Moy$_i$ > IARugosit eMax) | ARugositeNbDessusMax | X | X | X | X | |
| Average roughness | $\overline{BDRugositeMoy_i}$ | ARugositeMoy | X | X | X | X | |
| Tear, number of occurrences: number above maximal value | Nombre(BDArrNbOccMoy$_i$ > IAArrNbOccMax) | AArrNbOccNbDessusMax | X | X | X | X | |
| Tear, number of occurrences: average | $\overline{BDArrNbOccMoy_i}$ | AArrNbOccMoy | X | X | X | X | |
| Tear, area: number above maximal value | $Nombre\left(\frac{BDArrSurfaceTotale_i}{BDSurfaceUsinee_i} > IAArrSurfaceMax\right)$ | AArrSurfaceNbDessusMax | X | X | X | X | |
| Tear, average area | $\overline{\left(\frac{BDArrSurfaceTotale_i}{BDSurfaceUsinee_i}\right)}$ | AArrSurfaceMoy | X | X | X | X | |
| Tear, depth: number above maximal value | Nombre(BDArrProfMoy$_i$ > IAArrProfMax) | AArrProfNbDessusMax | X | X | X | X | |
| Tear, average depth | $\overline{BDArrProfMoy_i}$ | AArrProfMoy | X | X | X | X | |

TABLE 6e

| | | Volumes analysis | | | |
|---|---|---|---|---|---|
| Log volume (dm$^3$): average | $\frac{\overline{BDVolumeEstimeEntree_i}}{61.0237}$ | AVolumeEntreeMoy | X | X | |
| Half-squared cant volume (dm$^3$): average | $\frac{\overline{BDVolumeMesureSortie_i}}{61.0237}$ | AVolumeSortieMoy | X | X | |
| Chips volume (%): average | $\frac{(AVolumeEntreeMoy - AVolumeSortieMoy)}{AVolumeEntreeMoy} * 100$ | ApctCopeauxMoy | X | X | |
| Average chips volume: number above maximal value | Nombre(APctCopeauxMoy$_i$ > IAPctCopeauxMax) | ApctCopeauxMoy | X | X | |

The analysis module can generate requests on a continuous basis for the purpose of quality control as well as punctual requests from the operator aiming at specific analysis. Thus, that module receives images coordinates for first processing thereof in a calculation routine for then performing their interpretation. The images coordinates are transformed into conventional measurements according to scale constants obtained upon calibration. All points are then analyzed and filtered for generating two linear regression lines presenting the average line of cut faces profile, for each scanning plane. One also determines on these lines the coordinates corresponding to the corners of detected faces. From these points, the software calculates the values describing the measured profile geometry, namely the distance between faces, faces angle, diameter and position of original section, surface roughness and tear level. That result is stored for the following step consisting of performing groupings and statistical analysis. Considering that cutting defects are generally severe at log extremities, the data are distributed according to three principal zones, namely the infeed end, center and the outfeed end as illustrated on FIG. 3. Two narrower sub-zones are also defined at both infeed and ouffeed ends. Finally, the whole log forms a "total" zone, for a total six zones of calculated values groupings. For each grouping, the statistical analysis consists of establishing regression lines, calculating averages and standard deviations that will serve for cutting diagnostic. These data per zone are then stored into the database.

A complementary description of some of the aforesaid variables is presented in the following. In reference to FIG. 4*a*, pairs of corners 29, 29' and 30, 30' correspond to the points defining limits between corresponding regular (fine) surfaces 33 and 35, and the adjacent wane zones 37, 37' and 39, 39'. The top width "$L_h$" is calculated at the level of half-squared cant top portion between corner 29' found below corner 30' with respect to Y coordinate, and the line defining fine surface 35 at the opposed side. Similarly, the low width "$L_b$" is calculated at the level of half-squared cant lower portion between corner 29 found above corner 30 with respect to Y coordinate, and the line defining fine surface 35 at opposed side. The center widths "$L_{C1}$" and "$L_{C2}$" are calculated at the vertical middle of surfaces 33 and 35 with respect to center "C" of log, the estimation method thereof will be explained later in detail. The sum of widths "$L_{C1}$" and "$L_{C2}$" gives average width. Considering that the profile measurements are taken by the pairs of profile measurement devices 12, 12' and 19, 19' according to a same lateral orientation, but inspecting the half-squared cant and full-squared cant versions of the processed piece after rotating of 90°, the average width "$L_{C1}+L_{C2}$" of half-squared cant 11 shown on FIG. 4a according to a given scanning plane corresponds substantially to thickness "E" of the corresponding full-squared cant shown on FIG. 4b.

Figure 5A:
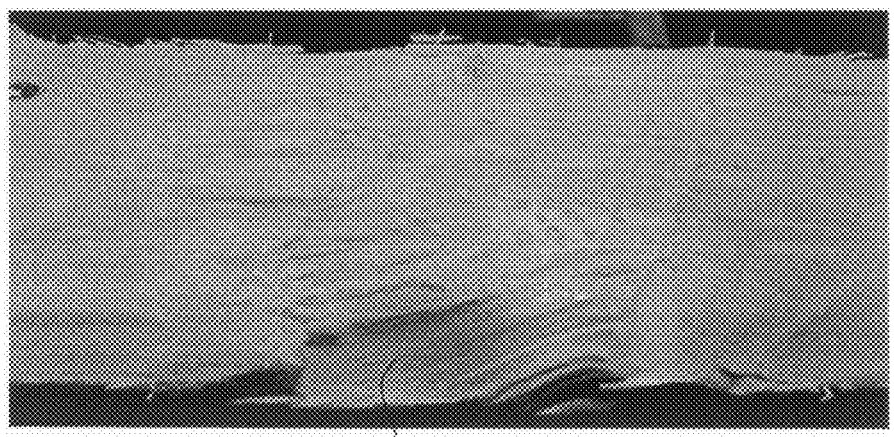
FIGS. 5a and 5b illustrate pieces presenting stripping.
Figure 5B:
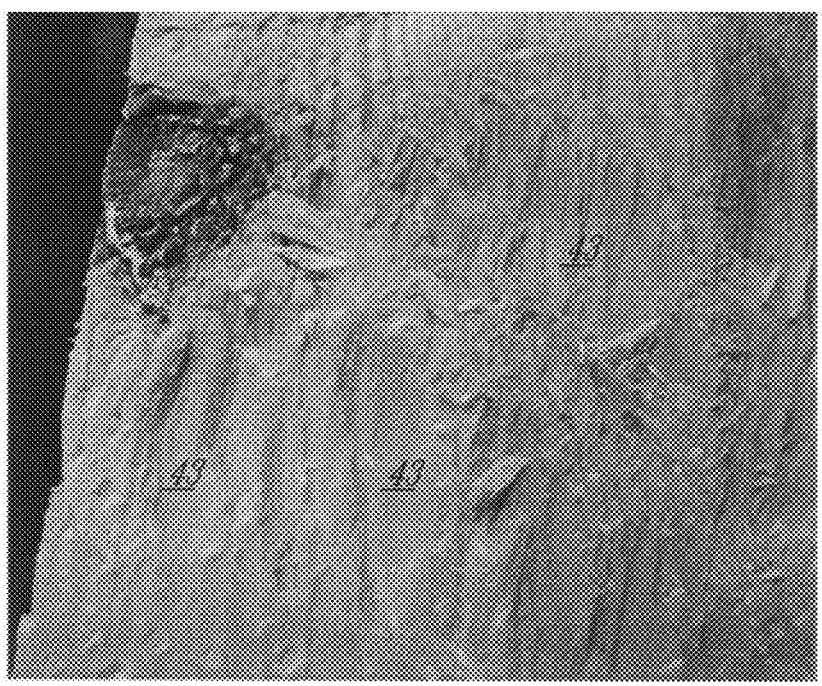
Figure 6:
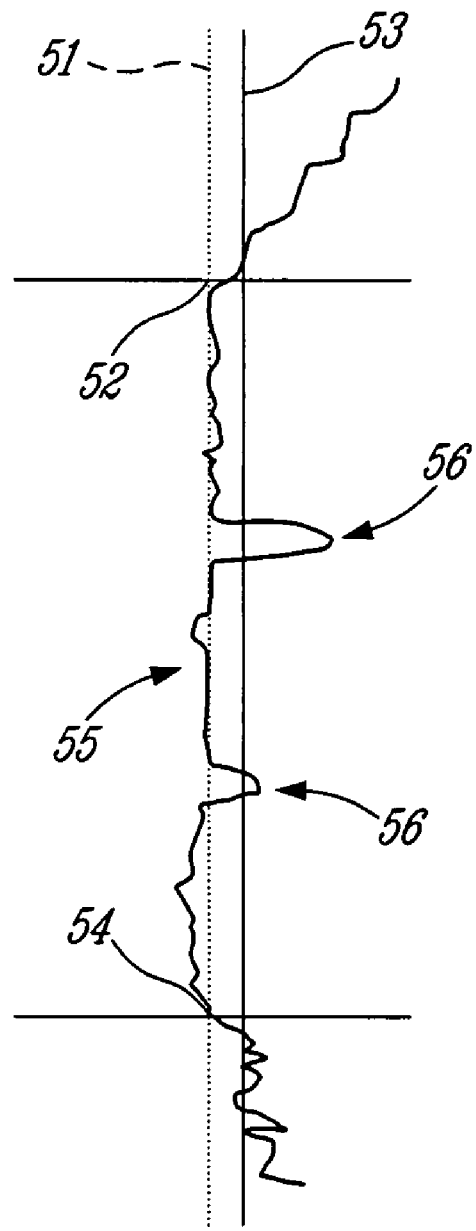
FIG. 6 represents analysis results of a piece portion presenting stripping.

Referring to FIGS. 5a and 5b, a tear zone is characterized by an absence of piece portion caused by knife travel that would have extracted wood to an excessive depth. Tear is mostly located at areas where the piece could have weaknesses, typically at areas where the knives leave wood surface laterally such as in the case of tear zone 41 on the piece shown on FIG. 5a or near knots such as in the case of tear zones 43 located in the central portion of the piece shown in FIG. 5b. Referring to FIG. 6, showing positions of corners 52, 54 delimiting cut surface 55, the tear index corresponds to the average deviation between centroids and the regression line shown by dots at 51, for points according to which deviation from regression line exceeds some predetermined threshold represented by line 53, which index can be related to tear depth, and as indicated at 56. In addition to depth, calculation is made of the area (linear, in inches) occupied by pixels used for the tear calculation as well as the number of tear occurrences. The number of occurrences represents the number of sections whose width exceeds some predetermined threshold. Considering that the width factor at the level of cameras varies in function of the position where corresponding data have been acquired, the data calculated upon calibration (slope and Y-coordinates of the regression line estimating width factors) are preferably used to approximate tear area in function of the number of points entering in the calculation. In order to prevent that insignificant information be reported (ex.: a tear region corresponding to only 1 mm), the software is programmed to ensure that tear region be constituted by a minimum number of points.

Figure 7:
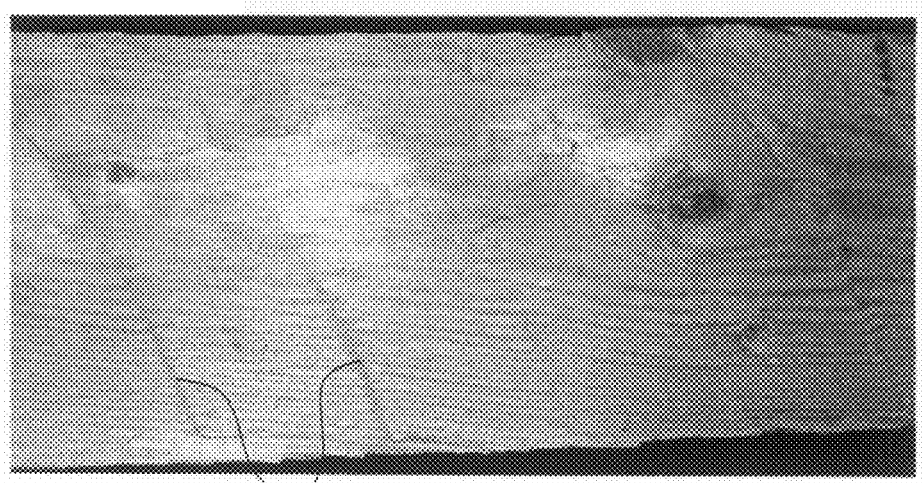
FIG. 7 shows a piece presenting knife marks.
Figure 8:
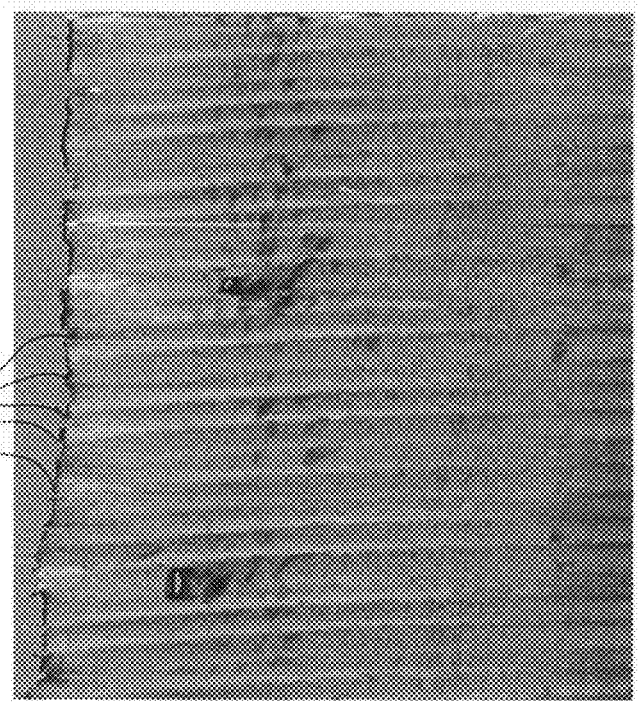
FIG. 8 shows a rebuilt image of a piece portion clearly showing knife marks.
Figure 9:
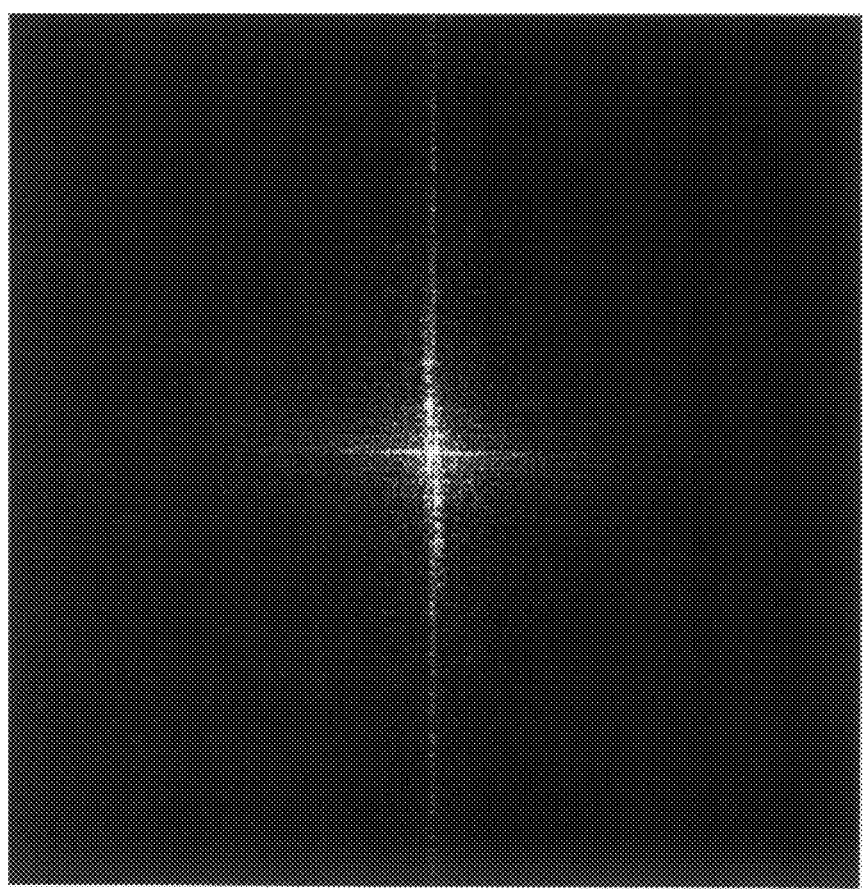
FIG. 9 shows the result of a Fast Fourier Transform (FFT) applied to the rebuilt image of FIG. 8.
Figure 10:
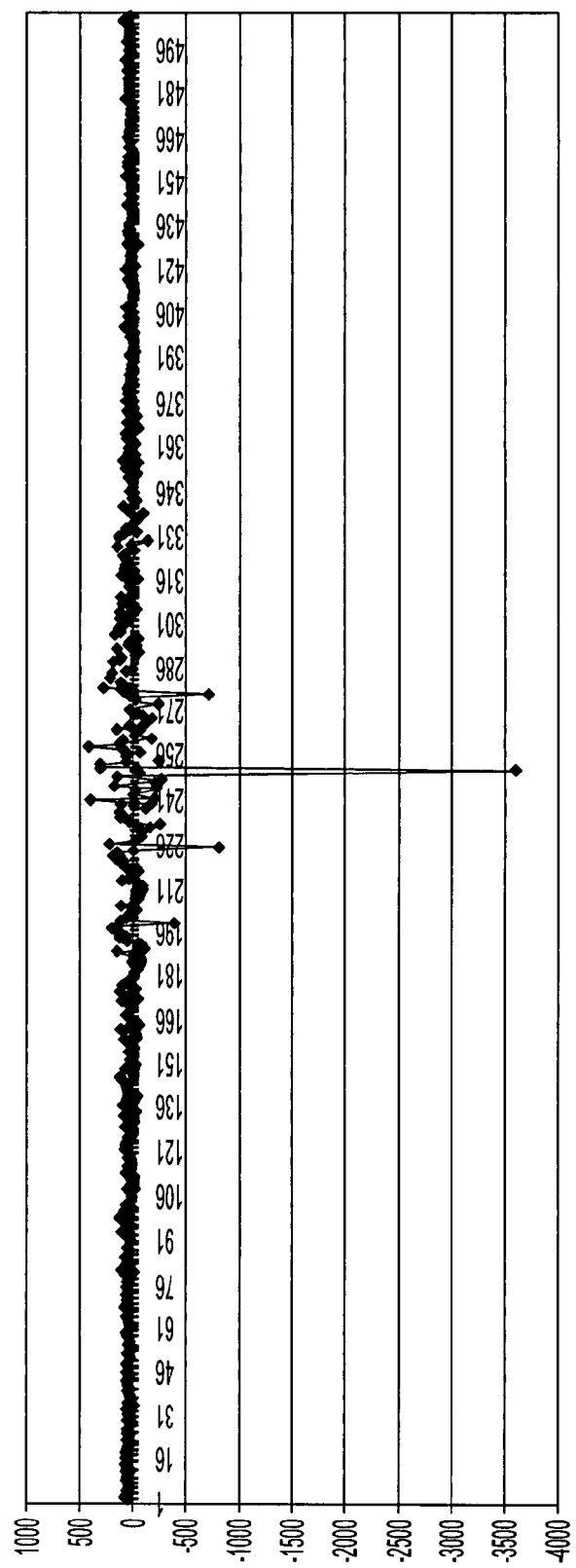
FIG. 10 shows a graphic presenting results analysis of the Fourier Transform shown in FIG. 9.

Referring to FIG. 7, marks 45 grooved into wood are the results of out of adjustment at the knives level. Typically, knife marks are present on wood at regular spacing, every X knife marks. However, the distance between marks may vary since the travel speed of pieces depends on the size of processed logs. Thus, knife marks on larger pieces are nearer from one another and farther from one another on smaller pieces, toward the travel direction thereof. They are present on log in the form of circular arcs. Considering that log surface is relatively non regular and that it is likely to find many holes and other defects, a binary indicator of the presence of knife marks is not used, the proposed method allowing to establish a probability for the presence of knife marks. As that probability approaches 1, more the risks to obtain out of adjustment at the knife level can be important. Moreover, since the sampling rate (typically of about one scanning every 7 mm), may prove to be insufficient, it is possible that a knife mark be not detected for a given plane. However, for a piece as a whole, that type of defect can be detected adequately. The knife marks presence probability is thus preferably calculated for a whole piece. In order to detect the presence of regular patterns at the log surface level without being much affected by high noise level, a Fast Fourier Transform (FFT) is preferably applied even if that technique requires a longer calculation time. However, since the log maybe subjected to sudden displacement between two consecutive scans, it would be difficult to directly compare the absolute positions of mass centers for two consecutive planes. Similarly, logs presenting a higher risk of being cone-shaped, that fact still causes problems if absolute coordinates were used. Consequently, it is proposed to apply FFT in intermediary signal rebuilt from information separately taken for each plane. That principle consists of creating an image whose grey level for a given point corresponds to the distance from that point to the regression line that approximates the area of that plane. Deeper the point is with respect to the surface (for example for a hole), lower the grey level will be. Reciprocally, more raised a point is with respect to the line (for example for a split-wood), higher the grey level will be. For the purpose of the application, floating points images are used. FIG. 8 shows an image obtained from such rebuilding on the basis of centroids, where one can easily distinguish patterns of knife marks 45'. The result of a fast Fourier transform to rebuild an image is presented on FIG. 9. One can remark that the spectrum is not perfectly vertical, which is an indirect consequence of the fact that knife marks are not horizontal but rather in the form of lightly inclined lines on FIG. 8. So as to obviate that problem, it is proposed to consider a thin rectangular zone from both sides of the center and to take an average along that zone, a graphic of obtained values being presented on FIG. 10. It has been experimentally observed that when knife marks are present on a piece, the corresponding frequency corresponds to about 1,5 standard-deviation from the values average. Consequently, it could be useful to segment values as a function of that threshold. Parallelism is defined as the slope between two opposing cut faces, which ideally should be parallel. Slope deviations are generally associated with the relative position adjustment of opposing tools that are provided on canters 13, 22. In practice, referring to FIG. 4a, the measurement of parallelism is preferably obtained by calculating the difference (in degrees) between the angle of first face 33 with respect to Y axis and the angle of second face 35 and that same Y axis.

Squaring is defined as the angle formed by two adjacent cut faces of a full-squared cant, which ideally should be perpendicular. Positioning deviations of the half-squared cant at the infeed end of second canter generally causes variations on the corresponding full-squared cant with respect to squareness. Even if it is possible to use profile measurement performed at the outfeed end of first canter 13, in practice, it is simpler to assume that faces 33 and 35 shown on FIGS. 4a and 4b are parallel, and that the horizontal plane formed by the conveyor on which rests face 35 as shown on FIG. 4b is parallel to these same faces. In this case, the squaring measurement corresponds to the difference (in degrees) between the average angle of lateral faces 47, 49 of a full-squared cant with respect to Y axis, and that same Y axis.

The roughness index preferably corresponds to RMS value of points deviations with respect to the regression line. For all points for which distance to the regression line is lower than some predetermined threshold, the square root of squared distances average is calculated. The position of wane zones as indicated at 37, 37' and 39, 39' on the half-squared cant shown in FIG. 4a, can be estimated with respect to adjacent fine surfaces 33 and 35, respectively. From profile limit positions $Y_h$ and $Y_b$ according to Y axis, or from $Y_h$ and $Y_h$-$Y_b$ (minimal height for the presence of pieces) as measured by the first canter complementary profile measurement device using emitter and receiver 44, 46 as shown in FIG. 1a and from positions of each fine surfaces 33, 35, the respective positions of both wane zones adjacent to each fine surface can be easily estimated. The position of wane zones as indicated at 39, 37 and 39' 37' on the full-squared cant shown on FIG. 4b, can be estimated in a similar manner, i.e. from profile limit position $Y_h$ and $Y_b$ according to Y axis or from $Y_b$ and $Y_h$-$Y_b$ as measured by the second canter complementary profile measurement device using emitter and receiver 44, 46 as shown in FIG. 1, or alternatively, from the measurements of thickness "E" equivalent to average width of the half-squared cant, equal to the sum of center width "$L_{C1}$" and "$L_{C2}$" shown on FIG. 4a.

Although a profile measuring unit 23 disposed upstream a log turner 48 is typically incorporated at the infeed end of a production line such as illustrated on FIG. 1, for, on one hand establishing positioning and rotation to be given to the piece so that it presents its curve line within the vertical plane prior to be fed to first canter 13, and on the other hand for elaborating a cutting plan, according to the principle of the invention, the area of the log at the infeed end of the first station of primary cutting is estimated from profile data related to the half-squared cant coming out from the first canter, so as to consider positioning variations with respect to commands generated on the basis of measurements made by unit 23. That estimation is performed through an approximation of the original log area prior feeding thereof into the canter. That calculation principally aims at providing a good indication of wood volume processed by devices 12, 12' of the profile measurement unit during a given period. Although maximal accuracy is desired for each half-squared cant, some error can be tolerated at each piece provided the global calculation gives an acceptable accuracy. Preferably, an elliptical approximation or modeling of log area is performed, an ellipse being calculated through a best-fit algorithm on the basis of profile data related to at least a portion of the outer cut surface of the piece, including points corresponding the position of corners, and from limit points according to vertical axis as measured by the complementary profile measurement unit as described above. It should be noted that the area at the infeed end of second canter 22 is necessarily the same as at the ouffeed end of first canter 13.

Figure 11:
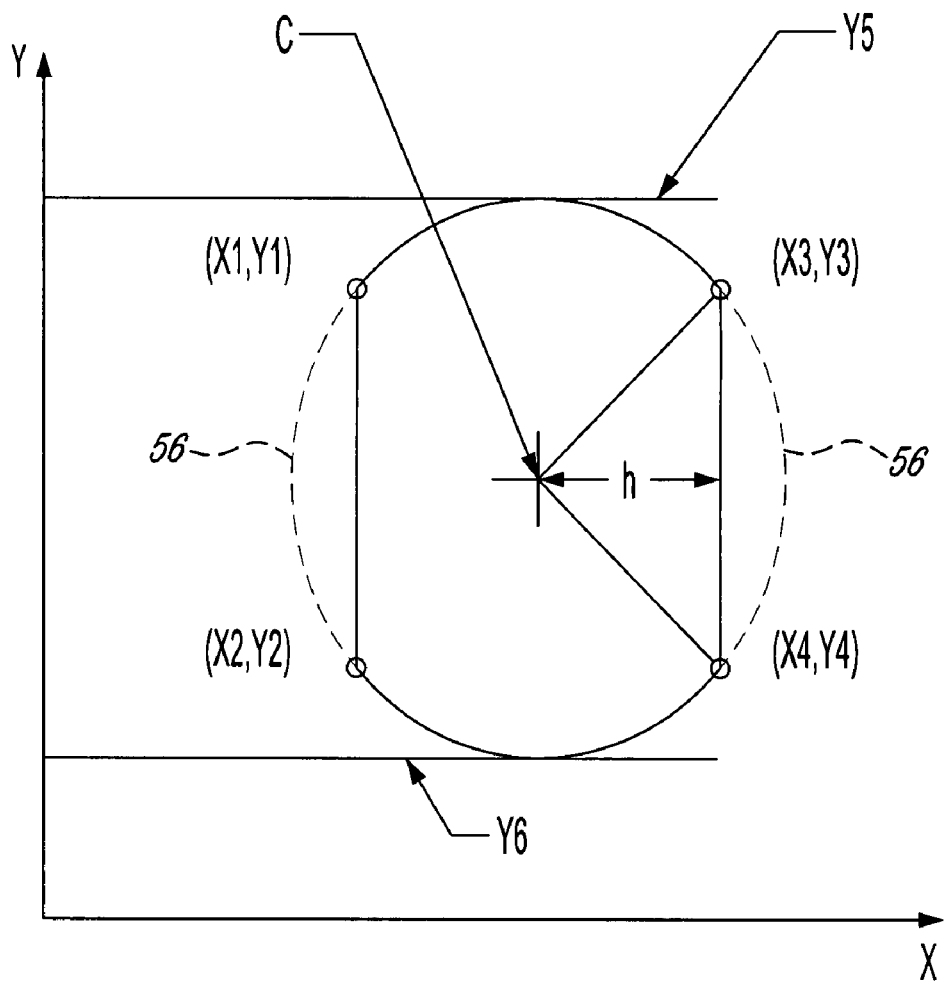
FIG. 11 illustrates a section of a log (cant) at ouffeed end of the first canter.

The calculation of piece area at ouffeed end aims at estimating the quantity of wood that has been eliminated by each one of canters 13, 22. FIG. 11 illustrates a log section (half-squared cant) at outfeed end of first canter 13. That section is modeled by an ellipse and doted lines 56 represent the surface removed by the canter. The illustrated case is an ellipse whose long axis is vertical with a perfect centering of faces with respect to the ellipse center. For each half-squared cant coming out from first canter 13, the piece area at outfeed end is calculated by subtracting from the estimated log total area the area occupied by the ellipse sector delimited by points ($X_3$, $Y_3$), ($X_4$, $Y_4$) and C and by adding the area of triangle ($X_3$, $Y_3$), ($X_4$, $Y_4$) C of height h. Concerning the area calculation for full-squared cants coming out from the second canter, referring to FIG. 4b, the wane area is estimated from information on width (X axis), on thickness (Y axis) and on position of fine faces 47, 49 by simulating an angle of 45° between top and bottom corners and the line defined by extreme corners. The approximation of missing surface becomes now easy by assuming a 45° angle.

Concerning rotation index, eccentricity, average diameter and ellipse center position, these parameters can be estimated from the following general equation for conic:

$$ax^2+bxy+cy^2+dx+ey+f=0 \quad (1)$$

As mentioned above, the available data for modelling the ellipse include coordinates (x, y) of four ellipse points, and coordinates $y_5$ and $Y_6$ of top and bottom tangency limit points. Assuming f≠0 equation (1) may be re-formulated as follows:

$$Ax^2+Bxy+Cy^2+Dx+Ey=1 \quad (2) \qquad (2)$$

The parameters A, B, C, D and E can be found on the basis of five known points $\{(x_i, y_i)\}$ through resolution of the following linear system:

$$Ax_1^2+Bx_1y_1+Cy_1^2+Dx_1+Ey_1=1$$

$$Ax_2^2+Bx_2y_2+Cy_2^2+Dx_2+Ey_2=1$$

$$Ax_3^2+Bx_3y_3+Cy_3^2+Dx_3+Ey_3=1$$

$$Ax_4^2+Bx_4y_4+Cy_4^2+Dx_4+Ey_4=1$$

$$Ax_5^2+Bx_5y_5+Cy_5^2+Dx_5+Ey_5=1 \quad (3)$$

In our case, we have only four points and two horizontal tangents (i.e. y'=0).

The derivative of equation (3) gives:

$$2Ax+By+Bxy'+2Cyy'+D+Ey'=0 \quad (4)$$

At the horizontal tangent points (y'=0) we thus have $$2Ax+By+D=0 \quad (5)$$

If ($x_5$, $y_5$) is one of these tangent points, we obtain the non-linear system:

$$Ax_1^2+Bx_1y_1+Cy_1^2+Dx_1+Ey_1=1$$

$$Ax_2^2+Bx_2y_2+Cy_2^2+Dx_2+Ey_2=1$$

$$Ax_3^2+Bx_3y_3+Cy_3^2+Dx_3+Ey_3=1$$

$$Ax_4^2+Bx_4y_4+Cy_4^2+Dx_4+Ey_4=1$$

$$Ax_5^2+Bx_5y_5+Cy_5^2+Dx_5+Ey_5=1$$

$$2Ax_5+By_5+D=0 \quad (6)$$

where A, B, C, D, E and $X_5$ are the unknowns. Rather than trying to directly solve that system, lets adopt the following iterative method:

1) Lets assume $x_5$=(x1+x2+x3+x4)/4.
2) The solution of the above linear system gives values of A,B,C,D,E
3) One calculates again a new $x_5$ value with equation (5):

$$x_5=-(By_5+D)/(2A) \ (A\neq 0) \quad (5)$$

4) Repeat the two preceding steps until the series $x_5$ values converges:

$$|x_{5i}-x_{5(i+1)}|<\text{tolerance}$$

Each one of both known tangents can give a distinct ellipse. It is in fact an over-determined system.

Assuming ($x_5$,$y_5$) and ($x_6$,$y_6$) are the two tangent points, then one can write:

$$Ax_1^2+Bx_1y_1+Cy_1^2+Dx_1+Ey_1=1$$

$$Ax_2^2+Bx_2y_2+Cy_2^2+Dx_2+Ey_2=1$$

$$Ax_3^2+Bx_3y_3+Cy_3^2+Dx_3+Ey_3=1$$

$$Ax_4^2+Bx_4y_4+Cy_4^2+Dx_4+Ey_4=1$$

$$Ax_5^2+Bx_5y_5+Cy_5^2+Dx_5+Ey_5=1$$

$$Ax_6^2+Bx_6y_6+Cy_6^2+Dx_6+Ey_6=1$$

$$2Ax_5+By_5+D=0$$

$$2Ax_6+By_6+D=0 \quad (7)$$

where A, B, C, D, E, $x_5$ and $x_6$ are the unknown. Using the preceding approximation of $x_5$ and $x_6$:

$$x_5=(x_1+x_2+x_3+x_4)/4$$

$$x_6=(x_1+x_2+x_3+x_4)/4$$

One can solve the following over-determined linear system by the least mean squares method:

$$Ax_1^2+Bx_1y_1+Cy_1^2+Dx_1+Ey_1=1$$

$$Ax_2^2+Bx_2y_2+Cy_2^2+Dx_2+Ey_2=1$$

$$Ax_3^2+Bx_3y_3+Cy_3^2+Dx_3+Ey_3=1$$

$$Ax_4^2+Bx_4y_4+Cy_4^2+Dx_4+Ey_4=1$$

$$Ax_5^2+Bx_5y_5+Cy_5^2+Dx_5+Ey_5=1 \quad (8)$$

If M is the following matrix:

$x_1^2 \; x_1y_1 \; y_1^2 \; x_1 \; y_1$ $x_2^2 \; x_2y_2 \; y_2^2 \; x_2 \; y_2$ $x_3^2 \; x_3y_3 \; y_3^2 \; x_3 \; y_3$ $x_4^2 \; x_4y_4 \; y_4^2 \; x_4 \; y_4$ $x_5^2 \; x_5y_5 \; y_5^2 \; x_5 \; y_5$ $x_6^2 \; x_6y_6 \; y_6^2 \; x_6 \; y_6 \quad (9)$ B the vector:
1
1
1
1
1
1 and X the following vector:
A
B
C
D
E

Then the solution of the linear system $M^tM\,X=M^tB$ (where $M^t$ is the transpose of matrix M) gives the solution of the over-determined linear system through the least mean squares method.

One can use A,B,C,D and E thus found to correct $x_5$ and $x_6$:

$$x_5=-(By_5+D)/(2A).$$

$$x_6=-(By_6+D)/(2A) \; (A \neq 0)$$

This procedure is repeated until both series of values $\{x_5\}$ and $\{x_6\}$ have converged. A mere reduction of the conic is required to find its principal axis, its 2 diameters and its center, to obtain the following equations:

ellipse:

$$\frac{\left(y_1+\frac{\alpha_1}{2\lambda_1}\right)^2}{\left(\sqrt{\frac{F'}{\lambda_1}}\right)^2} + \frac{\left(y_2+\frac{\alpha_2}{2\lambda_2}\right)^2}{\left(\sqrt{\frac{F'}{\lambda_2}}\right)^2} = 1 \quad (10)$$

where:

$\lambda_1 = a\cos^2\theta + b/2\sin 2\theta + c\sin^2\theta$ $\lambda_2 = a\sin^2\theta - b/2\sin 2\theta + c\cos^2\theta$ $$\theta = \frac{\arctan\left(\frac{b}{a-c}\right)}{2}$$

$\alpha_1 = d\cos\theta + e\sin\theta$ $\alpha_2 = -d\sin\theta + e\cos\theta$ $$F' = 1 + \frac{\alpha_1^2}{4\lambda_1} + \frac{\alpha_2^2}{4\lambda_2}$$

Position of ellipse center:

$$(x, y) = Q \begin{bmatrix} \frac{-\alpha_1}{2\lambda_1} \\ \frac{-\alpha_2}{2\lambda_2} \end{bmatrix}.$$

where:

$$Q = \begin{bmatrix} \cos(\theta) & -\sin(\theta) \\ \sin(\theta) & \cos(\theta) \end{bmatrix}$$

Ellipse area:

$$A = \pi * \sqrt{F'/\lambda_1} * \sqrt{F'/\lambda_2} \quad (11)$$

Average diameter:

$$\frac{(\sqrt{F'/\lambda_1} + \sqrt{F'/\lambda_2})}{2} \quad (12)$$

Eccentricity:

$$\frac{|(\sqrt{F'/\lambda_1} - \sqrt{F'/\lambda_2})|}{2} \quad (13)$$

For determining the large axis angle, the maximum between $\sqrt{F'/\lambda_1}$ and $\sqrt{F'/\lambda_2}$ must be first found. If $\sqrt{F'/\lambda_1} > \sqrt{F'/\lambda_2}$ then the large axis angle (with respect to vertical) is therefore $$90° - a\tan\left(\frac{\sin(\theta)}{\cos(\theta)}\right).$$

Otherwise, the angle is $$90° - a\tan\left(\frac{\cos(\theta)}{-\sin(\theta)}\right).$$

Figure 1B:
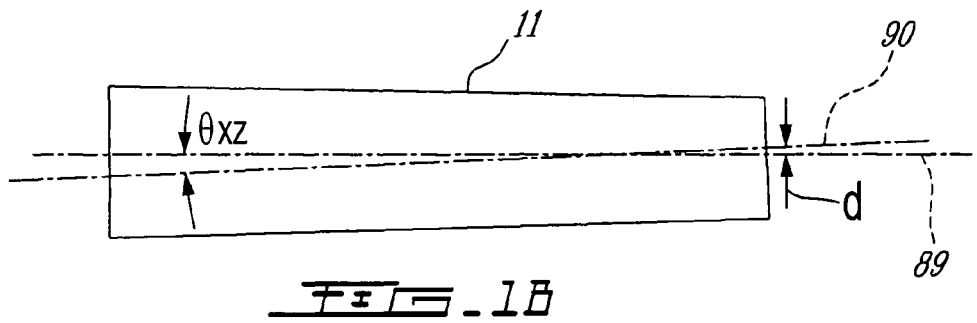
FIG. 1b is a schematic view of a log to be processed.
Figure 1C:
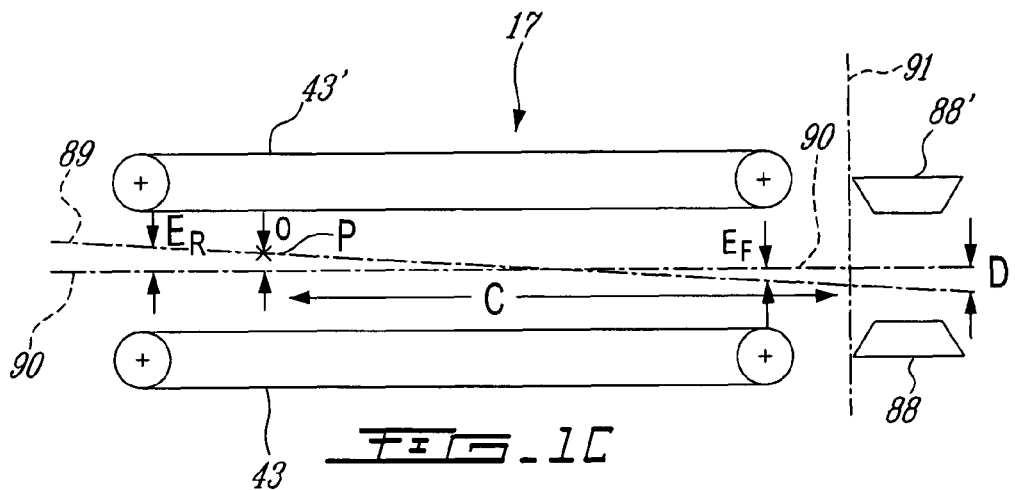
FIG. 1c is a schematic plan view of the guiding and cutting elements of the first station show in FIG. 1.

The calculation of "machine" travel axis and of the distances between ellipse centers with respect to that "machine" axis will now be explained referring to FIGS. 1b and 1c. The "machine" axis at 90 is defined as the regression line within plane XZ (Z being the axis corresponding to travel) for the points located at the middle of cut faces. In practice, middles are calculated by taking average of the four Y positions (one for each corner). Following this approximation of machine axis, the software calculates the distance from each ellipse centers to the regression line previously calculated.

Figure 1D:
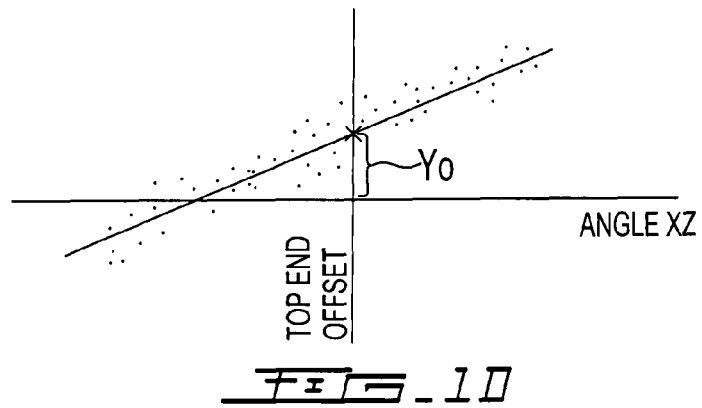
FIG. 1d is a graph showing the result of a statistical calculation related to log positioning.

The calculation of log rotation index is realized by performing two log rotations at the level of planes YZ and XZ. Although a single rotation in 3D would be more accurate, the error resulting from such approximation is negligible. The rotations performed in 2D does not consider X coordinates in the former case and Y in the latter case. The rotation reference point is the first central point of log, no translation being performed during rotations. These two rotations aim at aligning log axis as designated at 89 on FIG. 1b in parallel with the Z axis in the coordinates system used as shown in FIGS. 4a and 4b. Then, we project the resulting points within plane XY and calculates again the equation of the regression line within that plane. The angle (in degrees) that forms that line with Y axis corresponds to the log rotation index. In order to obtain an approximation of points distribution around the regression line, the software calculates the linear correlation coefficient corresponding to the preceding calculation. Referring now to FIG. 1b in view of Table 6c, the top end offset representing the distance "d" between log axis 89 and machine axis 90 at log top end is shown, along with the angle θxz formed by the intersection of these same axis with respect to reference axis XZ. For each log scanned and processed, the values of these parameters are calculated. Then, referring to FIG. 1d, from the cumulative data for a sample containing a plurality of logs, a statistical calculation is performed consisting of applying a linear regression on top end offset values with respect to corresponding angle θxz values. The slope of the resulting linear regression line is calculated as well as the Y-coordinate at origin $Y_o$. These values are then used to define the position of a virtual log pivot axis "p" shown in FIG. 1c. The calculated slope value is used to estimate the distance "c" from log pivot to cutting front 91, while the found Y-coordinate at origin $Y_o$ is used to estimate the distance "o" between virtual log pivot and machine axis 90. Finally, the canter front support distance "$E_F$" and canter rear support distance "$E_R$" for correction off-axis can be calculated in the manner presented in Table 6c. In practice, these corrective positional data can be used to make adjustment of front and rear supports (not shown) provided on the feeding and guiding device 17, onto which are mounted guiding belts 43 and 43', in order to reorient the log axis at infeed end of canter 13 substantially in the direction of machine axis 90, to compensate positioning (translation and rotation components) variations. Alternatively, the translation component may be corrected by transversely displacing canter tools 88, 88' according to a calculated top end position at cutting front "D" as shown in FIG. 1c, while adjusting the front and rear supports to compensate only for rotation deviation. The guiding adjustment may be manually made by the operator, or be performed automatically through the PLC by providing the device 17 with appropriate controlled actuators.

The calculation of sweep implies an estimation of the position of extremities of line segment that connects the ellipse centers corresponding to log extreme points. The distance between each one of points and the line connecting these extreme points is calculated, the maximal distance corresponding to log sweep. In order to avoid alteration of results due to isolated data, a median filtering of data is preferably performed prior to the calculation. The maximal distance is calculated by assuming that points $x_1=(x_1,y_1,z_1)$ and $x_2=(x_2,y_2,z_2)$ are at log extremities, any point located on the line being expressed as:

$$v = \begin{bmatrix} x_1 + (x_2 - x_1)t \\ y_1 + (y_2 - y_1)t \\ z_1 + (z_2 - z_1)t \end{bmatrix}$$

where t is a real constant. The square of distance between a point on the line having t parameter and a point $x_0=(x_0,y_0,z_0)$ is therefore:

$$d^2 = [(x_1-x_0)+(x_2-x_1)t]^2 + [(y_1-y_0)+(y_2-y_1)t]^2 + [(z_1-z_0)+(z_2-z_1)t]^2.$$

So as to obtain the distance between point $x_0$ and the line, it is necessary to minimize $d^2$ and therefore, it is necessary to have $d(d^2)/dt=0$ (it is "physically" clear that a minimum is obtained). We then find:

$$t = -\frac{(x_1 - x_0) \cdot (x_2 - x_1)}{|x_2 - x_1|^2}$$

where * denotes the scalar product between the vectors. The minimal distance is obtained by replacing parameter t within the above equation.

A third module (MPProfilo) constitutes a self-governing application whose interactive interface allows the user to modify operation parameters, launch or interrupt data acquisition, display calculation values and analyzed values, proceed with calibration, save and re-process (function replay) off line information related to selected pieces. Although this module is not required for the functioning of the acquisition, calculation and storage system, it is required to launch or interrupt the data processing sequence, and to visualise its functioning. This module can also be run in multiple duplicates on the computers linked to the network.

A fourth module (half-squared cant analyzer) is a self-governing application whose interface allows to browse between several display windows to visualize alarms status and trend of statistical values, either for a given period for the last group of pieces or per piece. The other display windows allow to modify parameters, to define alarms and sampling rate for each variable. This interface is used to supervise normal operation of the cutting line and to show evolution of the main performance indicators with respect to time.

The third module (MPProfilo) allows activation of the acquisition and images analysis mode, as well as other maintenance and diagnostic modes. The following section presents various menus and displays available for the user as generated by the software.

Figure 12:
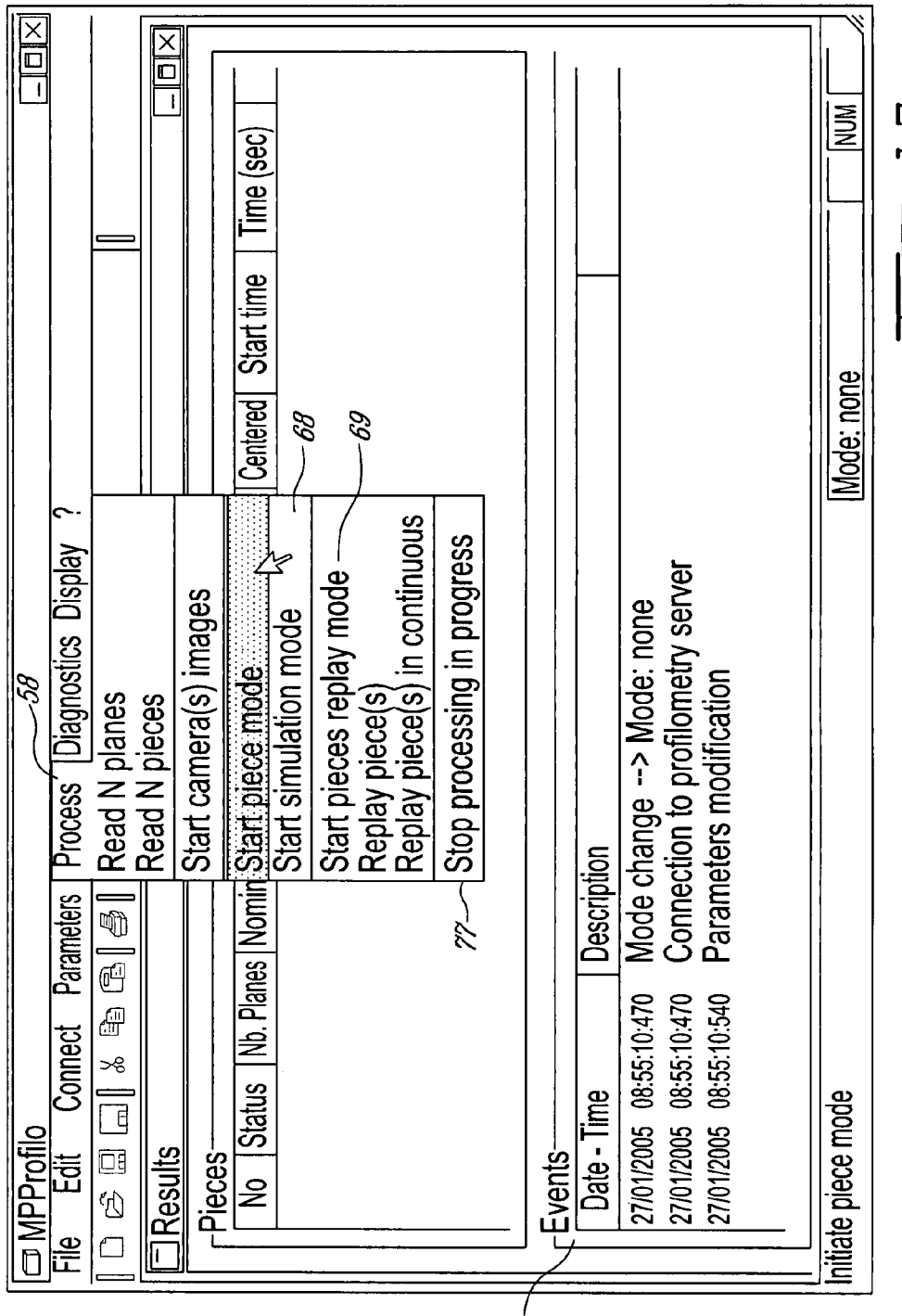

FIG. 12 shows in the main window, a "Process" scrolling menu at 58 and the available functions choices. This system allows the operator to enter the number of planes to be captured. A new window "Plane(s) data" immediately displays the sequence of scanned planes at cameras, until the indicated maximum is reached. The system then allows the operator to enter the number of pieces to be captured. The main window "Results" immediately displays the sequence of scanned pieces at cameras until the indicated maximum is reached. New windows open for displaying in continuous a sampling of images at cameras. This mode is useful for calibration since it allows to ensure that various patterns are well covered by cameras.

The "Piece" mode activated through menu item 65 is the normal functioning mode. This mode activates data acquisition, as well as calculation and analysis routines. The "Results" main window displays new information line each time a piece analysis is ended, as illustrated on FIG. 13. At any time, it is possible to display the detail of values for a piece by double-clicking the appropriate line within the "Results" window. One then can see the "Piece profilo" window appearing as illustrated on FIG. 14 for calculated values, and the "Analyzed results" window for analyzed values as shown on FIG. 16. One can activate them selectively to scan available information. The "Piece profilo" data are all calculated values for each plane and for each face. On FIG. 14, one sees tabs 59, 59' to be clicked to switch from a "per plane" group to a "per face" group shown on FIG. 15. For long logs, the number of planes is very high. The values for plane in each column are:
Plane: number of plane scanned
Position (in): plane distance from infeed end
Status: error code
Top width: distance between faces at top (in)
Center width: distance between faces at centre (in)
Bottom width: distance between faces at bottom (in)
Height: section diameter (in)
Infeed area: section prior cutting (in$^2$)
Outfeed area: section after cutting (in$^2$)
Parallelism: angle between two faces (°)
Squaring: angle of median line of two faces (°)
X machine off-axis: horizontal coordinates of estimated section center (in)
Y machine off-axis: vertical coordinates of estimated section center (in)

The values per face in each column are:
Plane: number of plane scanned
Position (in): plane distance from infeed end
Face: Right or Left identification
Status: error code
Roughness: below a given threshold, RMS value of surface points deviations (in)
Top Wa.: distance between cut face edge and log top
Area: vertical dimension of cut face
Bottom Wa.: distance between cut face edge and log bottom
Tea. Occ.: number of distinct tear zones within that plane
Tea. Widt.: average width of tear zones (in)
Tea. Dept.: average depth or tear zones (in)
CHx: X coordinates of cut face top edge (in)
CHy: Y coordinates of cut face top edge (in)
CBx: X coordinates of cut face bottom edge (in)
CBy: Y coordinates of cut face bottom edge (in)

The "Analyzed results" data shown on FIG. 16 are all averages and standard-deviations obtained by grouping calculated values according to measurement type, and to zone. FIG. 16 to 20 show the tabs identifying each measurement type, and the values per zone, within their associated windows. On FIG. 16, the "Sawing variation" tab 60 selects data applying to dimension control:
Number of values used: number of planes correctly scanned
Number of values cancelled: number of planes without valid results
Ave. dimension deviation: average of deviations between calculated width (top and bottom), and input width at PLC (in)
Ave. widt.: average of calculated widths (top and bottom) (in)
Widths variance: sum of square of calculated widths deviations (top and bottom), and of average width, divided by number of values used (in$^2$)
Widths standard-deviations: square root of "widths variance" (in)
Sum (square dim. deviations): sum of square calculated widths deviations and input width at PLC (in$^2$)

Figure 17:

The "Shape analysis" tab 61 shown on FIG. 17 displays data that control the squaring level:
Nb. of values used: number of planes correctly scanned
Nb. of values cancelled: number of planes without valid results
Ave. parallelism: vertical angle between two faces (°)
Ave. squaring: vertical angle between two faces (°)
Taper: angle formed by two faces lengthwise (°)

The "Positioning" tab 62 shown in FIG. 18 presents various values indicating the position of log within the reference system at the time of being cut. By grouping the data on several logs, the "Half-squared cant analysis" module will establish average angle and position deviations caused by the guiding system.
Nb. of values used: number of planes correctly scanned
Nb. of values cancelled: number of planes without valid results
Ave. X off-axis: average horizontal coordinate of centers for all estimated sections (in)
Ave. Y off-axis: average vertical coordinate of centers for all estimated sections (in)
Log angle XZ: angle formed between log neutral axis (regression of centers) and cutting axis (°)
Top end offset: log neutral axis position at initial contact point with cutting heads (in)
Rotation error: angular deviation between main log bending plane and vertical reference plane (°)
Rotation correlation: coefficient indicating the certainty degree according to which the bending plane has been determined (approaches zero for straight logs)
Rotation sweep: sweep measured within the main bending plane (in)

The "Surface/cutting" tab 63 shown on FIG. 19 applies to values describing the cutting quality of half-squared cant faces. It is pointed out that variables are identified at left (L) and right (R) sides:
Nb. of values used: number of planes correctly scanned
Nb. of values cancelled: number of planes without valid results
Ave. roughness L: below a given threshold, RMS value of surface points deviations (in)
Ave. roughness R: same as L (in)
Tea. total area L: total extent of point above tear threshold multiplied by scanning interval, gives the total tear area (in$^2$)
Tea. total area R: same as L
Tea. ave. dept. L: above a given threshold, average value of surface points deviation (in)
Tea. ave. dept. R: same as L
Ave. nb. tea. occ. L: number of tear zones whose extent exceeds a minimum threshold
Ave. nb. tea. occ. R same as L
Cut area L: total left face area.

Cut area R: same as L

Prob knifes L: index related to intensity of a pattern caused by a knife out of position. An index approaching 1.0 confirms a severe out of adjustment.

Prob. knives R: same as L

The "Volumes" tab 64 shown on FIG. 20 presents values to be used to express the material yield of primary cutting, for a given width, or for all dimensions.

Nb. of values used: number of planes correctly scanned

Nb. of values cancelled: number of planes without valid results

Ave. height: average vertical extent of the cut face (in)

Infeed volume.: calculated volume of log by summing for all planes, the estimated oval area per plane multiplied by the scanning interval ($in^3$)

Ouffeed volume: volume of half-squared cant calculated by summing for all planes, the remaining area per plane multiplied by the scanning interval ($in^3$)

Figure 21:
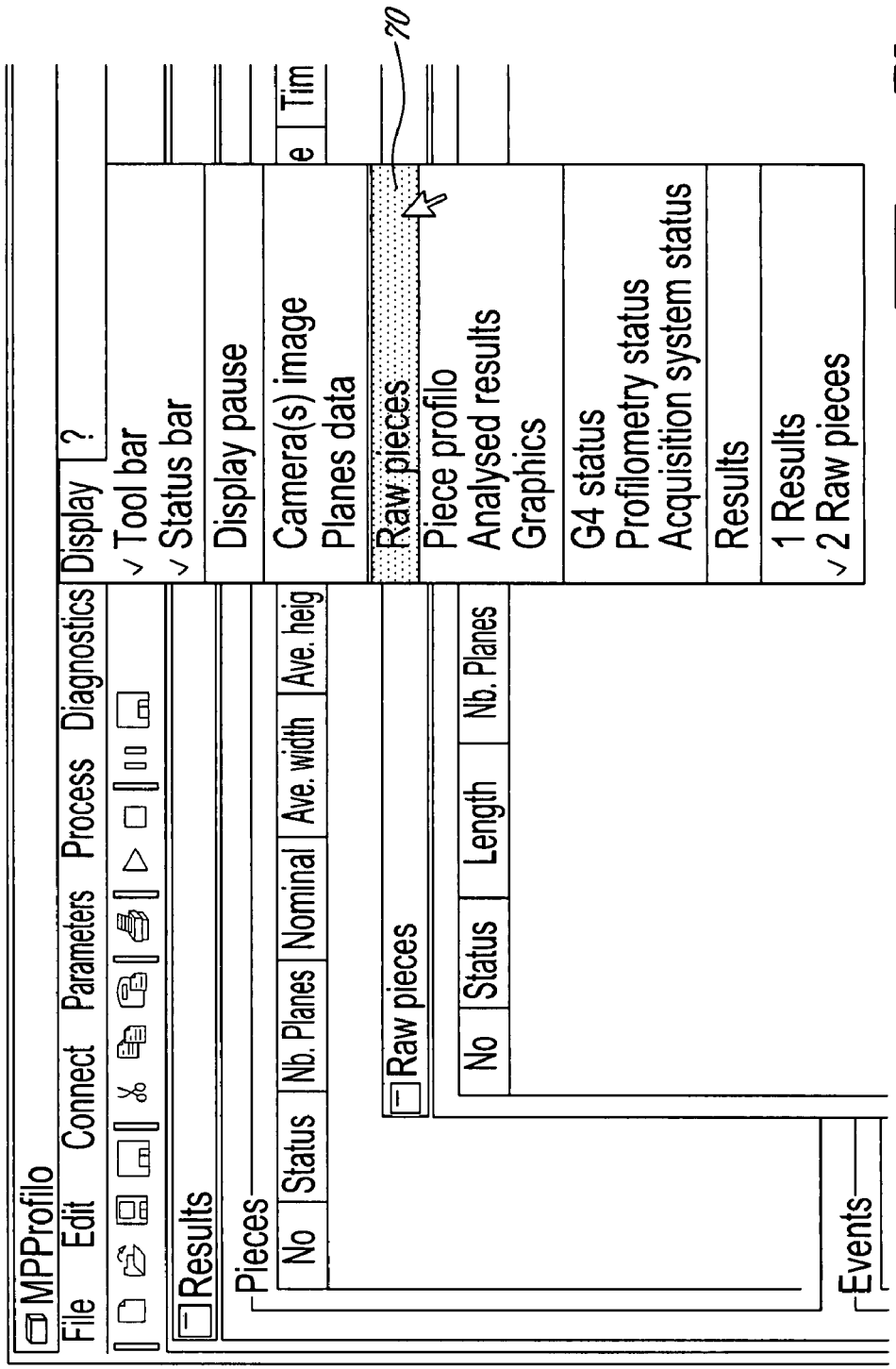

The "Simulation" mode activated through menu item 68 shown on FIG. 12, allows all user interfaces to function without being linked to the scanning system. It calls for a computer program generating random calculation data for simulating scanning of half-squared cants of various dimensions. These dummy data are analyzed and can be stored into the database so as to feed the "Half-squared cants analyzer" module. The "Replay pieces" mode is activated through menu item 69 shown on FIG. 12 to do again calculation of piece values from raw data coming from the scanning system. These raw data can be obtained during the operation or originate from a previous data backup. In all cases, the "Raw pieces" window must be opened through menu item 70 as shown on FIG. 21 to confirm the availability of data to replay.

In operation ("Piece" mode activated), data from each scanned half-squared cant will accumulate, line by line, within the "Raw pieces" window. Prior to enter into "Piece" mode, it is required to activate the "Send raw data in piece mode" option at 72 on the window shown on FIG. 27, by accessing to profilometry parameters item of scrolling menu 71 shown on FIG. 24. Within the "Results" window as shown on FIG. 13, analyzed data will also appear, after a short delay with-respect to the raw data display. When the desired data are displayed in the "Raw pieces" window as shown on FIG. 21, one terminates the "Piece" mode by clicking the appropriate square within the icons bar at 67. Data can also be brought within the "Raw pieces" window by opening raw data files saved with a ".PBP" extension. These files are the subject of save and load functions when the "Raw pieces" window is active.

Figure 22:
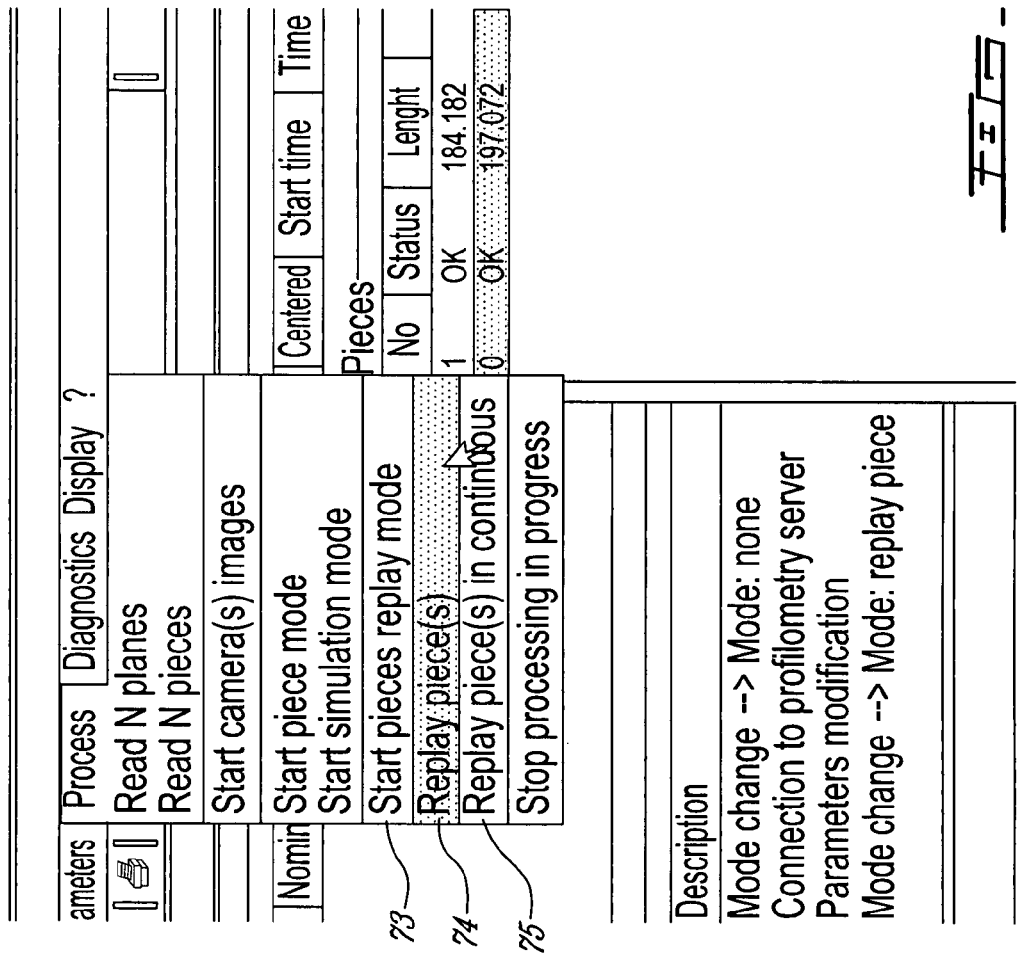

Referring to FIG. 22, after having selected "Start pieces replay mode" menu item at 73 and selected one or more half-squared cants within the "Raw pieces" window, the "Replay piece(s)" at menu item 74 allows to do again the calculation and analysis phases, with display of results within the "Raw pieces" and "Results" windows. If some parameters or calculations have been changed, new values will be displayed. The "Replay piece(s) in continuous" function at menu item 75 is identical to the preceding, with the exception that processing must be interrupted by clicking the appropriate square within the icons bar at 67.

In the "MPProfile" interface, there must be only one processing in progress. The "Events" frame designated at 76 on the main window shown on FIG. 12 indicates if there is an active mode by identifying thereof on the last line of the events list. By clicking on the "Stop processing in progress" through menu item 77, one can interrupt the selected processing. This scrolling menu choice appears in grey (not shown) if no processing is in progress.

Figure 23:
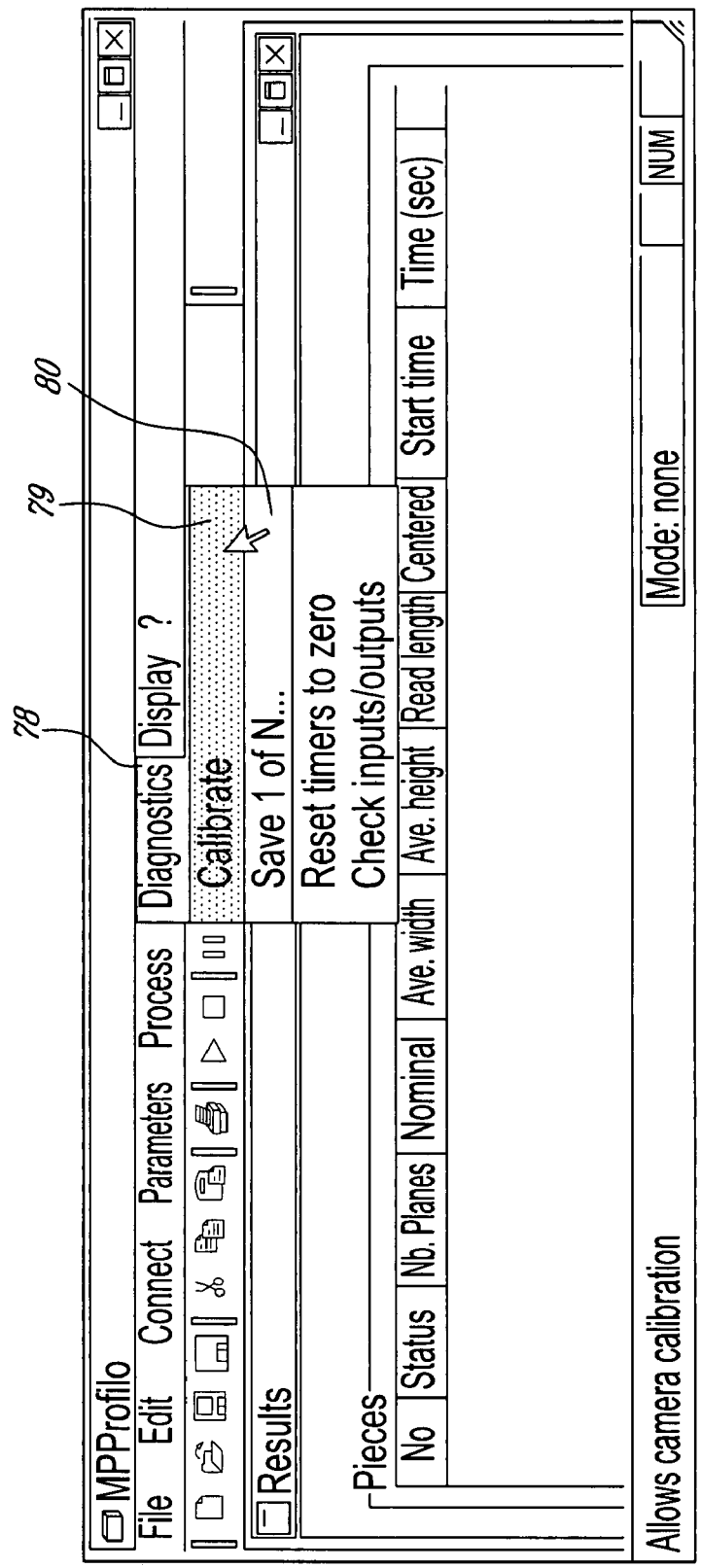

FIG. 23 shows a "Diagnostic" scrolling menu at 78 giving access to the following functions. The "Calibrate" function at menu item 79 is used in the calibration procedure mentioned above. This function must be used only when all procedure steps have been followed. Otherwise, reference files will be replaced by defective files and it will no longer be possible to obtain calibrated measurements. The "Save 1 of N" function at menu item 80 allows to indicate the number of pieces to be ignored between each pieces back up. The pieces are saved with extension ".APL" in the corresponding directory. Saved pieces can be replayed. Other functions allow to reset counter to "Zero" and to verify inputs/outputs.

Figure 24:
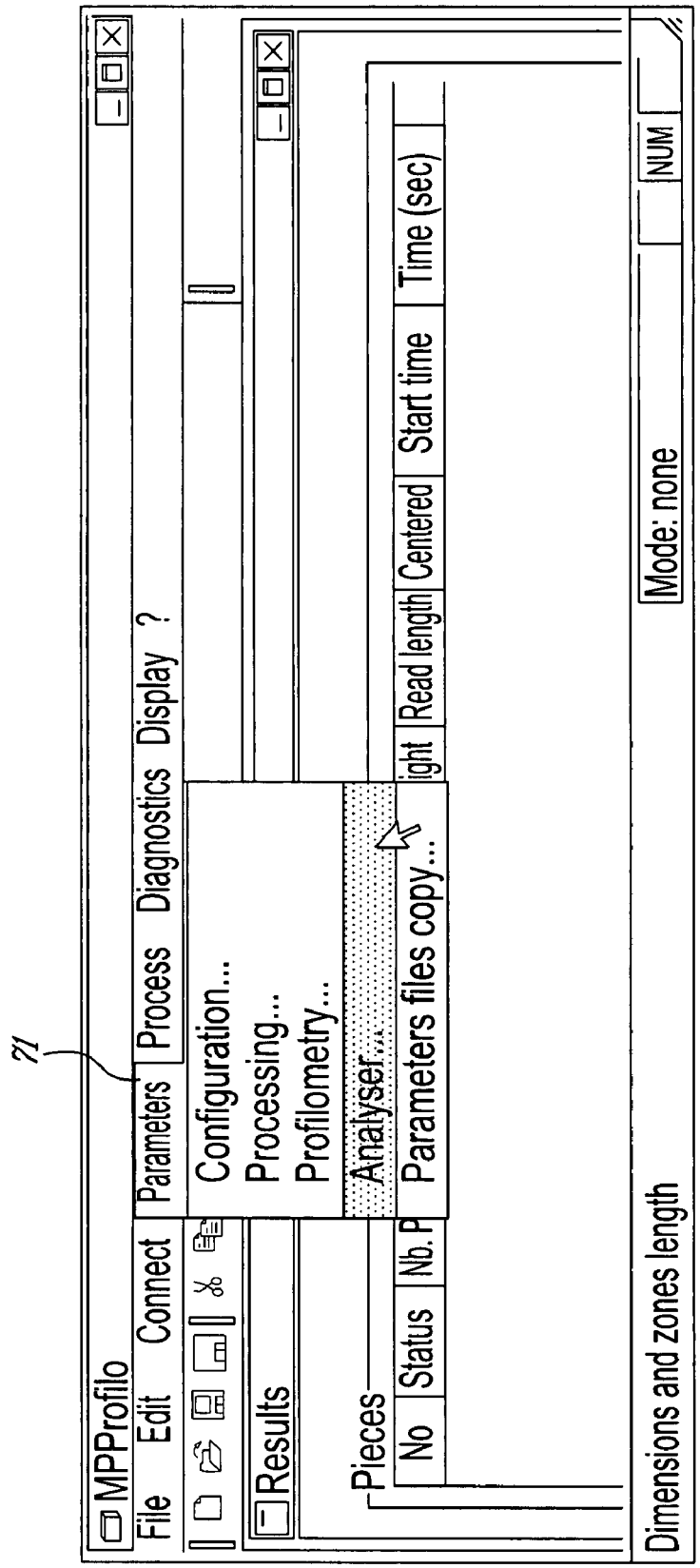

FIG. 24 shows the "Parameters" scrolling menu 71 referred to above, giving access to the following functions.

Figure 25:
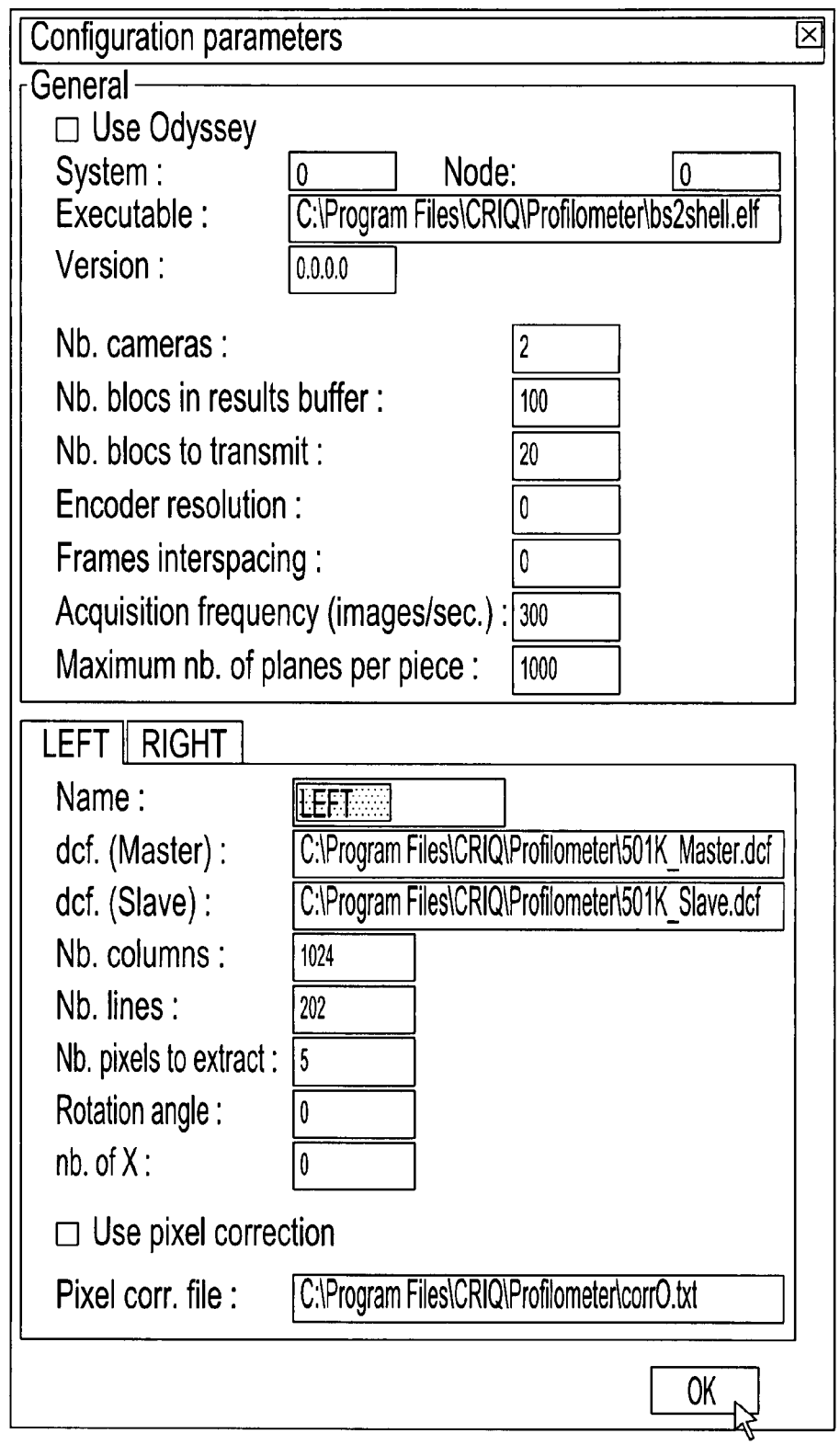

The "Configuration parameters" screen shown on FIG. 25 includes permanent values of the vision system and no modification is required by a normal user.

The "Processing parameters" screen shown on FIG. 26 includes permanent values of the vision system and no modification is required by a normal user.

The "Profilometry parameters" screen shown FIG. 27 includes permanent values of the vision system and apart from the selection of "Send data in piece mode" mentioned above, no modification is required by a normal user.

FIG. 28 shows a screen giving access to analyzer parameters.

Figure 29:
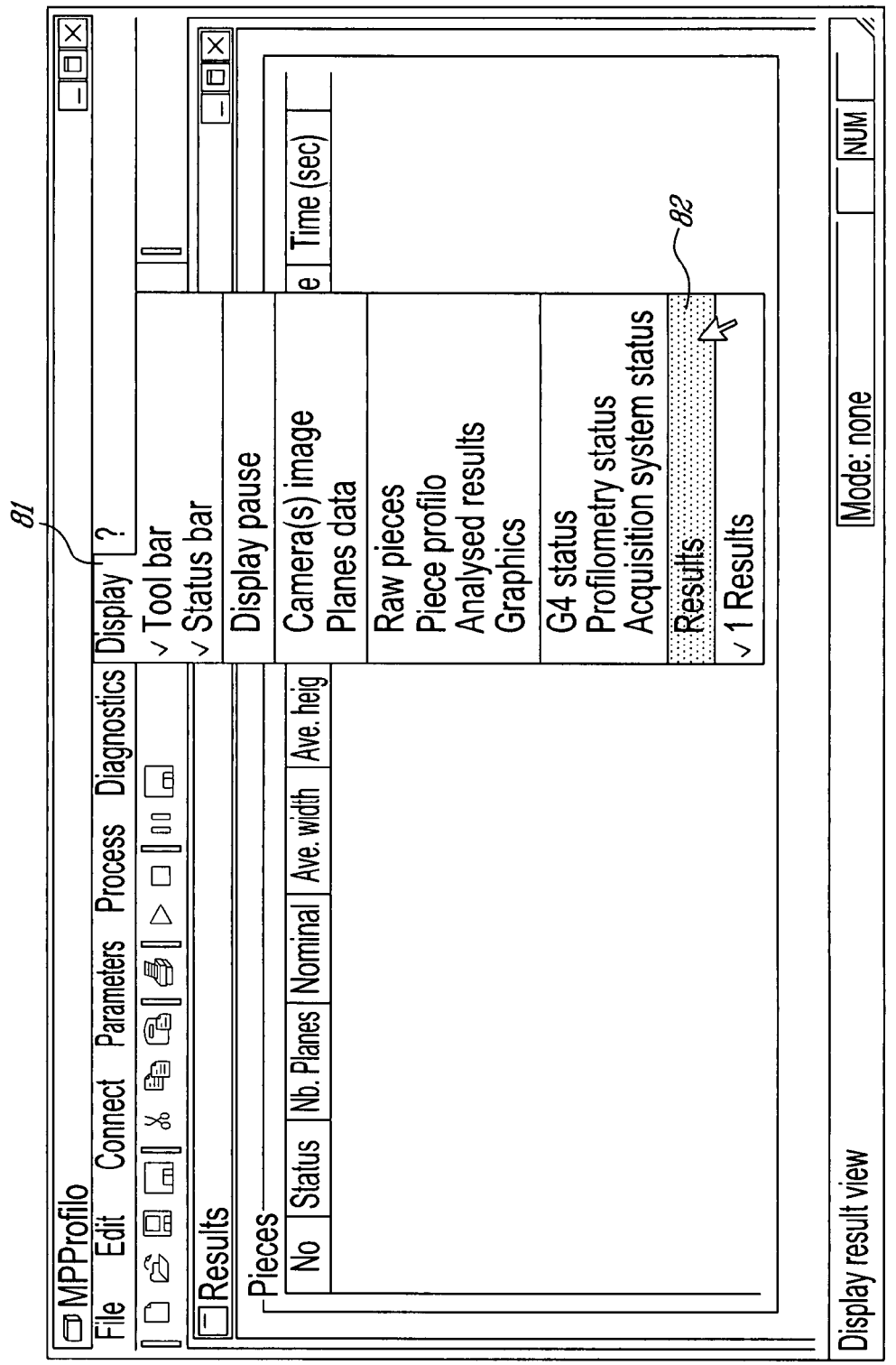

FIG. 29 shows a "Display" scrolling menu at 81 and accessible functions. A bottom portion of the scrolling menu at 82 presents the open "Results" window, with a hook at the active "1Result" window. Most of windows that can be displayed are described herein above, regarding operation mode ("Proces" scrolling menu 58). A particular case is the "Results" window as part of the basic interface. It can be opened with the application and cannot be closed. FIGS. 30, 31, 32 and 33A-33B respectively present the displayed windows related to the "Analysed results" through menu item 84, "Acquisition system status" through menu item 85, "Planes data" through menu item 86 and "Graphics" functions through menu item 87.

Figure 35:
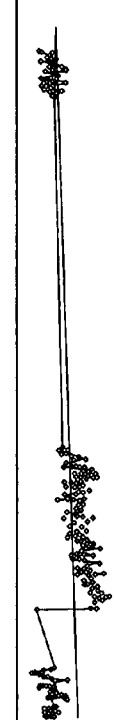
Figure 37A:
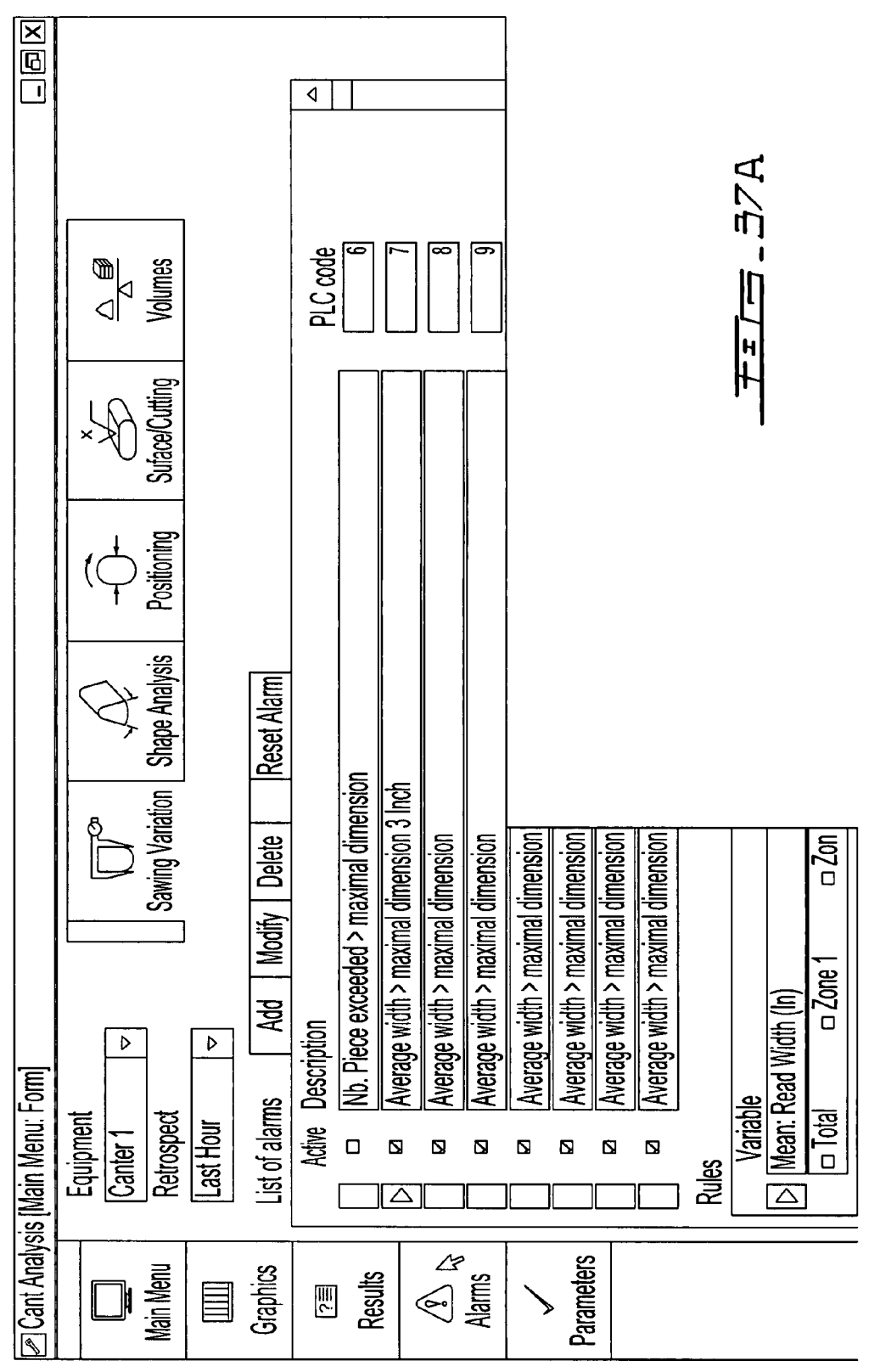
Figure 41A:
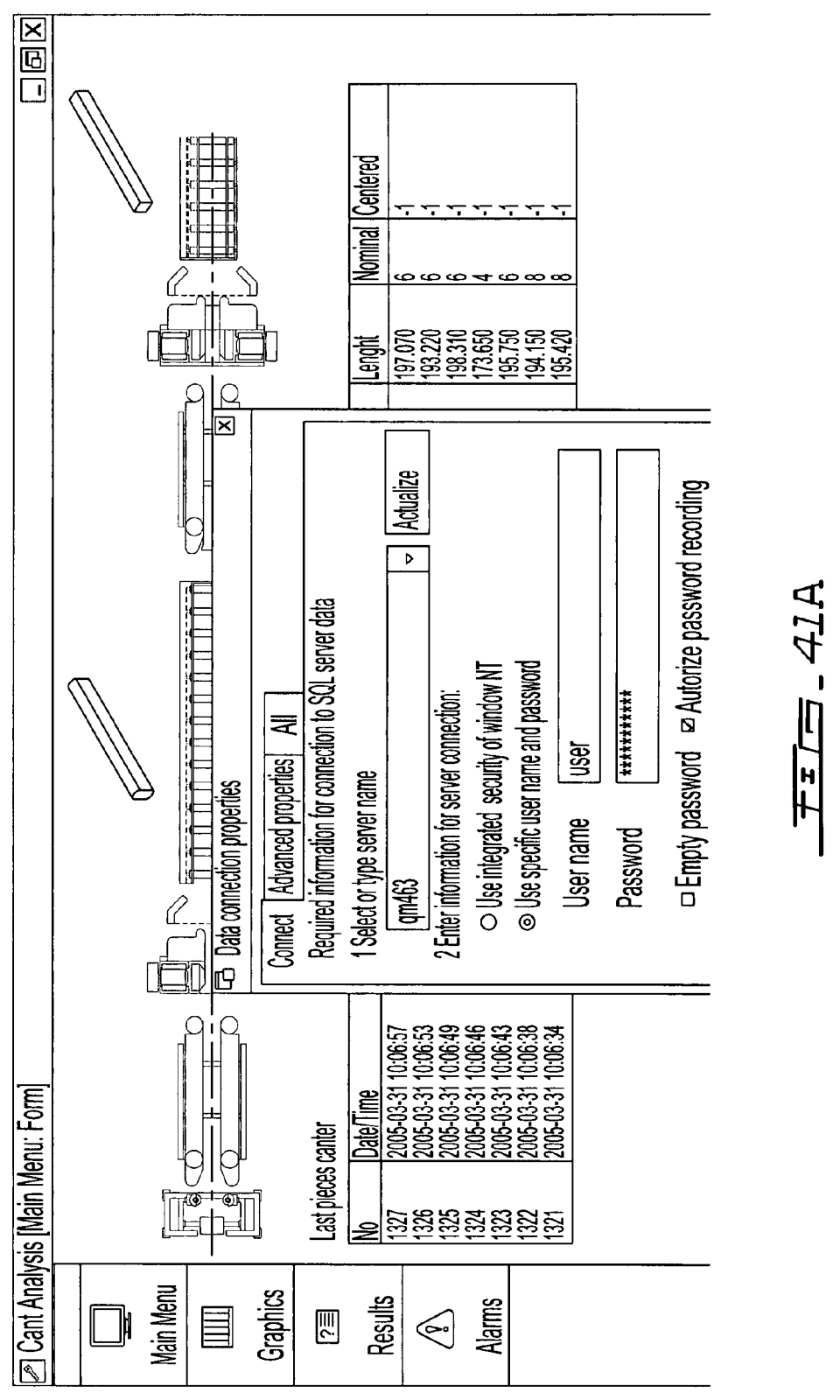
Figure 41B:
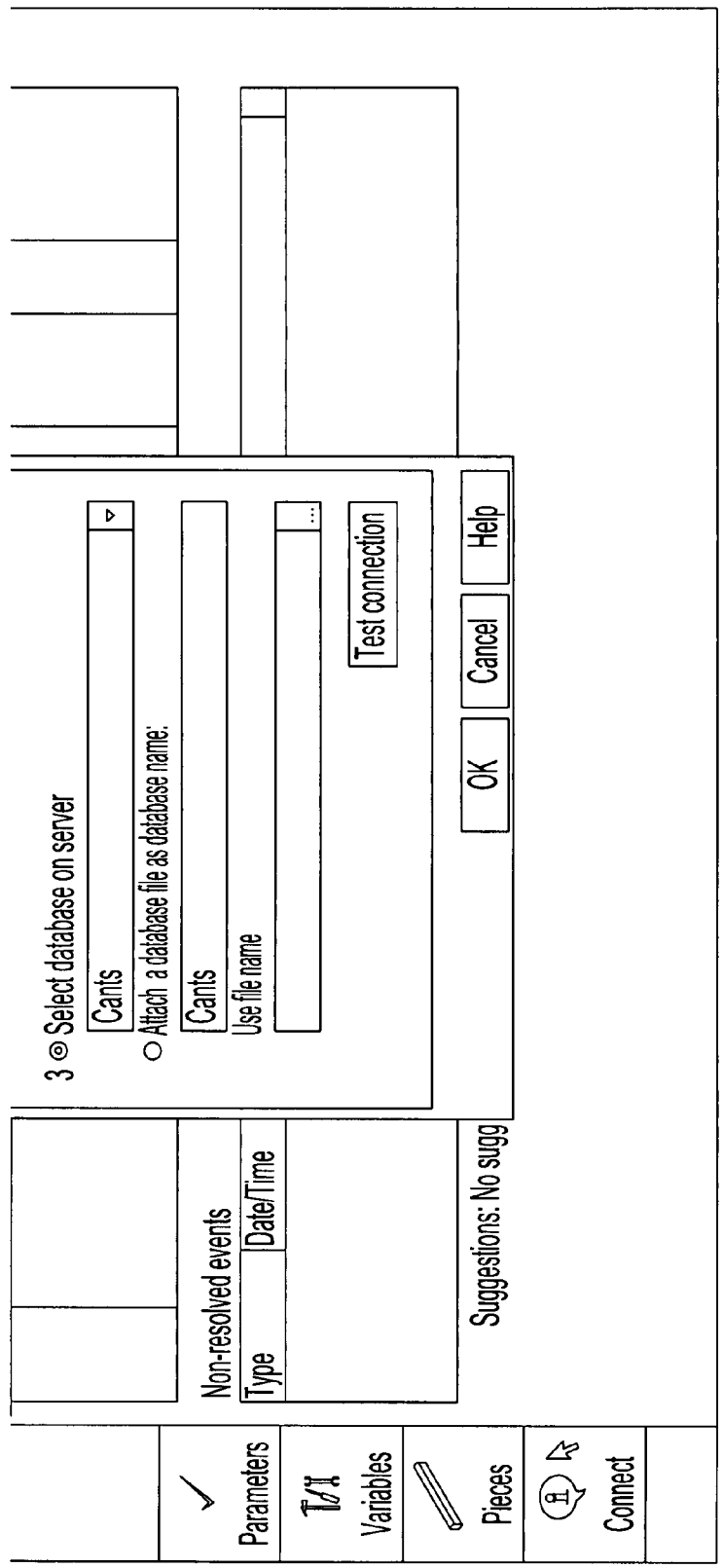

The quality control module integrated in the software allows to present results related to the analysis of various quality related parameters, including the calculation of statistics (average values, standard-deviations), critical values and alarms. FIG. 34 presents a graphical display of the sawing line and of the alarms. FIG. 35 presents the graphical display of variable values in statistical review. FIG. 36 presents the display of last analyzed values for a sampling. FIGS. 37a and 37b presents the definition screen of warnings and alarms. FIGS. 38a and 38b presents the definitions of critical values and values sent to PLC. FIGS. 39a and 39b presents sampling rates per variable. FIGS. 40a and 40b presents a display of analyzed results per piece. Finally, FIGS. 41a and 41b presents a screen allowing to manage database connection.

It is to be understood that the above described devices and software modules as part of the preferred embodiment represent only one of a multiplicity of approach to implement the concept of the present invention, and all modifications, variants, additional features or alternate embodiments thereof that could be proposed by a person skilled in the art and falling within the scope of the appended claims are contemplated.

We claim:

1. A cut quality monitoring method for use with a station for cutting a log having raw profile characteristics into a cant having a peripheral surface including at least one pair of opposing cut faces separated by uncut portions, said method comprising the steps of:

a) feeding said log lengthwise to said cutting station to produce said one pair of opposing cut faces, while guiding said log substantially in a direction of a machine axis defined by said station;

b) measuring the profile of said peripheral surface at a plurality of cross-sections along said machine axis to generate corresponding post-cut profile data;

c) estimating said log raw profile characteristics from said post-cut profile data to generate corresponding raw profile data; and d) deriving from said post-cut profile data and raw profile data, resulting data on at least one parameter related to the cutting quality of said log.

2. The method according to claim 1, wherein said raw profile data includes data defining a longitudinal axis substantially passing through a plurality of cross-section centers along said log, said at least one parameter being a machine off-axis indicating parameter representing positional deviation of said longitudinal axis with respect to said machine axis.

3. The method according to claim 2, wherein said positional deviation has a translation component and a rotation component.

4. The method according to claim 2, wherein said steps a) to d) are repeated for a plurality of further logs to obtain resulting data related to the cutting quality of all said logs, said method further comprising the step of:

e) processing said resulting data to produce resulting statistical data on machine off-axis indicating parameter representing positional deviation of said logs longitudinal axis with respect to said machine axis.

5. The method according to claim 4, wherein said positional deviation has a translation component and a rotation component.

6. The method according to claim 4, further comprising the step of:

f) repeating said steps a) to d) following said step e) for a next further log while using said statistical data for guiding said next further log substantially in a direction of said machine axis.

7. The method according to claim 6, wherein said positional deviation has a translation component and a rotation component.

8. The method according to claim 1, wherein said at least one parameter is volume of wood removed to produce one of said cut faces.

9. The method according to claim 1, wherein said step c) is performed using elliptical modeling.

10. The method according to claim 9, wherein said elliptical modeling is based on a portion of said profile data representing respective positions of selected points on said peripheral surface.

11. The method according to claim 10, wherein some of said selected points correspond to corners defined by intersection of said cut faces with said uncut portions.

12. The method according to claim 11, wherein some of said selected points are related to a diameter estimation of said log.

13. A cut quality monitoring method for use with primary and secondary stations for cutting a log having raw profile characteristics into a cant having a peripheral surface including first and second pairs of opposing cut faces separated by uncut portions, said pairs being substantially mutually perpendiculars with one another, said method comprising the steps of:

a) feeding said log lengthwise to said primary cutting station to produce said one pair of opposing cut faces, while guiding said log substantially in a direction of a machine axis defined by said primary station;

b) measuring the profile of said peripheral surface at a plurality of cross-sections along said machine axis to generate corresponding post-cut profile data;

c) estimating said log raw profile characteristics from said post-cut profile data to generate corresponding raw profile data;

d) deriving from said post-cut profile data and raw profile data, resulting data on at least one parameter related to the cutting quality of said log;

e) feeding said log as cut by the primary cutting station lengthwise to said secondary cutting station to produce said second pair of opposing cut faces, while guiding said cut log substantially in a direction of a further machine axis defined by said secondary station;

f) measuring the profile of said peripheral surface including said second pair of opposing cut faces at a plurality of cross-sections along said further machine axis to generate corresponding further post-cut profile data; and g) deriving from all said post-cut profile data and raw profile data, further resulting data on at least one parameter related to the cutting quality of said log.

* * * * *